(12) United States Patent
Benedetto

(10) Patent No.: US 11,729,479 B2
(45) Date of Patent: Aug. 15, 2023

(54) METHODS AND SYSTEMS FOR DYNAMIC SUMMARY QUEUE GENERATION AND PROVISION

(71) Applicant: Sony Interactive Entertainment Inc., San Mateo, CA (US)

(72) Inventor: Warren M. Benedetto, Foothill Ranch, CA (US)

(73) Assignee: Sony Interactive Entertainment Inc., San Mateo, CA (US)

( * ) Notice: Subject to any disclaimer, the term of this patent is extended or adjusted under 35 U.S.C. 154(b) by 0 days.

(21) Appl. No.: 17/165,410

(22) Filed: Feb. 2, 2021

(65) Prior Publication Data

US 2022/0210523 A1 Jun. 30, 2022

Related U.S. Application Data

(60) Provisional application No. 63/132,909, filed on Dec. 31, 2020.

(51) Int. Cl.
*H04N 21/8549* (2011.01)
*H04N 21/239* (2011.01)
(Continued)

(52) U.S. Cl.
CPC ....... *H04N 21/8549* (2013.01); *A63F 13/355* (2014.09); *G11B 27/19* (2013.01); *H04N 21/235* (2013.01); *H04N 21/2393* (2013.01)

(58) Field of Classification Search
CPC ............ H04N 21/8549; H04N 21/235; H04N 21/2393; H04N 21/233; H04N 21/23418;
(Continued)

(56) References Cited

U.S. PATENT DOCUMENTS 10,363,488 B1 7/2019 Willette et al.
2002/0194351 A1* 12/2002 Nishimura .......... H04L 65/1101
709/229

(Continued)

OTHER PUBLICATIONS

Roohi, Shaghayegh et al., "Recognizing Emotional Expression in Game Streams," Proceedings of the 2020 CHI Conference on Human Factors in Computing Systems, ACMPUB27, New York, NY, Oct. 17, 2019, pp. 302-311.

(Continued)

*Primary Examiner* — Adil Ocak
(74) *Attorney, Agent, or Firm* — Penilla IP, APC

(57) ABSTRACT

A stream of a media item is transmitted from a server computing system to one or more client computing systems. The media item has a timeline for playback of the media item. Participant-generated content is received at the server computing system from one or more participants at any of the one or more client computing systems. The participant-generated content is time-indexed to the timeline of the media item. The participant-generated content is processed to identify key portions of the media item based on indications present within the participant-generated content. A dynamic summary queue is generated that includes the key portions of the media item. The dynamic summary queue is assembled for streaming. A request to view the dynamic summary queue is received from a requestor. In response to the request, a stream of the dynamic summary queue is transmitted to a computing device of the requestor.

25 Claims, 8 Drawing Sheets

(51) Int. Cl.
*A63F 13/355* (2014.01)
*G11B 27/19* (2006.01)
*H04N 21/235* (2011.01)

(58) Field of Classification Search
CPC .. H04N 21/251; H04N 21/437; H04N 21/475; H04N 21/4781; H04N 21/858; A63F 13/355; A63F 13/86; A63F 13/87; G11B 27/19; G11B 27/031
See application file for complete search history.

(56) References Cited

U.S. PATENT DOCUMENTS

| | | | |
|---|---|---|---|
| 2010/0251295 A1* | 9/2010 | Amento | H04N 21/475 |
| | | | 725/38 |
| 2013/0346868 A1* | 12/2013 | Scherpa | G06F 3/01 |
| | | | 715/730 |
| 2015/0074700 A1* | 3/2015 | Danovitz | H04N 21/6125 |
| | | | 725/14 |
| 2018/0332354 A1* | 11/2018 | Boniface | H04N 21/4788 |
| 2019/0012442 A1* | 1/2019 | Hunegnaw | G06K 9/00228 |
| 2019/0321732 A1* | 10/2019 | Zimring | A63F 13/235 |
| 2020/0365188 A1 | 11/2020 | Brinkman, Jr. et al. | |
| 2021/0037295 A1* | 2/2021 | Strickland | H04N 21/8133 |

OTHER PUBLICATIONS

International Patent Application No. PCT/US2021/064463, International Search Report and Written Opinion of the International Searching Authority, dated Apr. 22, 2022, 15 pages.

* cited by examiner

Recap Options — 500

| | Control | Current Setting | | |
|---|---|---|---|---|
| 501 | Participant Basis | All Participants | Change | Reset |
| 503 | Time Window | 0:00 to Current Time | Change | Reset |
| 505 | Recap Resolution | Medium (10 segment) | Change | Reset |
| 507 | Event Types | Custom | Change | Reset |
| 509 | Indication Types | Auto + Custom | Change | Reset |

Fig. 5A

Participant Basis — 511

| Participant | Current Setting (Include/Exclude) | Modify |
|---|---|---|
| A | Include | Change |
| B | Exclude | Change |
| C | Include | Change |
| D | Exclude | Change |

513

Fig. 5B

METHODS AND SYSTEMS FOR DYNAMIC SUMMARY QUEUE GENERATION AND PROVISION

CLAIM OF PRIORITY

This application claims priority under 35 U.S.C. 119(e) to U.S. Provisional Patent Application No. 63/132,909, filed Dec. 31, 2020, the disclosure of which is incorporated herein by reference in its entirety for all purposes.

BACKGROUND

1. Field of the Disclosure

The present disclosure relates to methods and systems for providing video game and/or media content over a network between a server computing system and a client computing system.

2. Description of the Related Art

The video game industry has seen many changes over the years. As computing power has expanded, developers of video games have likewise created game software that takes advantage of the growing computing power. To this end, video game developers have been coding games that incorporate sophisticated operations and mathematics to produce a very realistic game experience.

Example gaming platforms include the Sony PlayStation®, Sony PlayStation2® (PS2), Sony PlayStation3® (PS3), Sony PlayStation4® (PS4), and Sony PlayStation5® (PS5), each of which is sold in the form of a game console. As is well known, the game console is designed to connect to a display (typically a television) and enable user interaction through handheld controllers. The game console is designed with specialized processing hardware, including a CPU, a graphics synthesizer for processing intensive graphics operations, a vector unit for performing geometry transformations, and other glue hardware, firmware, and software. The game console may be further designed with an optical disc reader for receiving game discs for local play through the game console. Online gaming is also possible, where a user can interactively play against or with other users over the Internet. For example, the PlayStation® Network is an online digital media entertainment service that provides for online play of video games, streaming of video content (e.g., television, movies, sporting events, game play video, etc.), and streaming of music or other audio content. In addition to accommodating expanding computing power, video game developers are also developing online games that increase the interaction between users and the gaming system. For example, interactive online games provide the ability for a user to interactively play against or with other users over the Internet and capture such interactions. It is within this context that the present invention arises.

SUMMARY

In an example embodiment, a method is disclosed for generating a summary of a media item. The method includes transmitting a stream of a media item from a server computing system to one or more client computing systems. The media item has a timeline for playback of the media item. The method also includes receiving participant-generated content at the server computing system from one or more participants at any of the one or more client computing systems. The participant-generated content is time-indexed to the timeline of the media item. The method also includes processing the participant-generated content to identify key portions of the media item based on indications present within the participant-generated content. The method also includes generating a dynamic summary queue that includes the key portions of the media item. The dynamic summary queue is assembled for streaming. The method also includes receiving a request to view the dynamic summary queue from a requestor. The method also includes transmitting a stream of the dynamic summary queue to a computing device of the requestor in response to the request.

In an example embodiment, a system is disclosed for generating a summary of a video. The system includes program instructions stored in a computer memory for transmitting a stream of a media item from a server computing system to one or more client computing systems. The media item has a timeline for playback of the media item. The system also includes program instructions stored in the computer memory for receiving participant-generated content at the server computing system from one or more participants at any of the one or more client computing systems. The participant-generated content is time-indexed to the timeline of the media item. The system also includes program instructions stored in the computer memory for processing the participant-generated content to identify key portions of the media item based on indications present within the participant-generated content. The system also includes program instructions stored in the computer memory for generating a dynamic summary queue that includes the key portions of the media item. The dynamic summary queue is assembled for streaming. The system also includes program instructions stored in the computer memory for receiving a request to view the dynamic summary queue from a requestor. The system also includes program instructions stored in the computer memory for transmitting a stream of the dynamic summary queue to a computing device of the requestor in response to the request.

BRIEF DESCRIPTION OF THE DRAWINGS

FIG. 5A shows an example user interface that provides various controls for allowing the requestor of the dynamic summary queue to customize how the dynamic summary queue is generated, in accordance with some embodiments.

FIG. 5B shows an example of a user interface that is displayed when the "Change" control is selected within the participant basis control in the user interface of FIG. 5A, in accordance with some embodiments.

DETAILED DESCRIPTION

In the following description, numerous specific details are set forth in order to provide a thorough understanding of the present disclosure. It will be apparent, however, to one skilled in the art, that embodiments of the present disclosure may be practiced without some or all of these specific details. In other instances, well known process operations have not been described in detail in order not to unnecessarily obscure the present disclosure.

Figure 1:
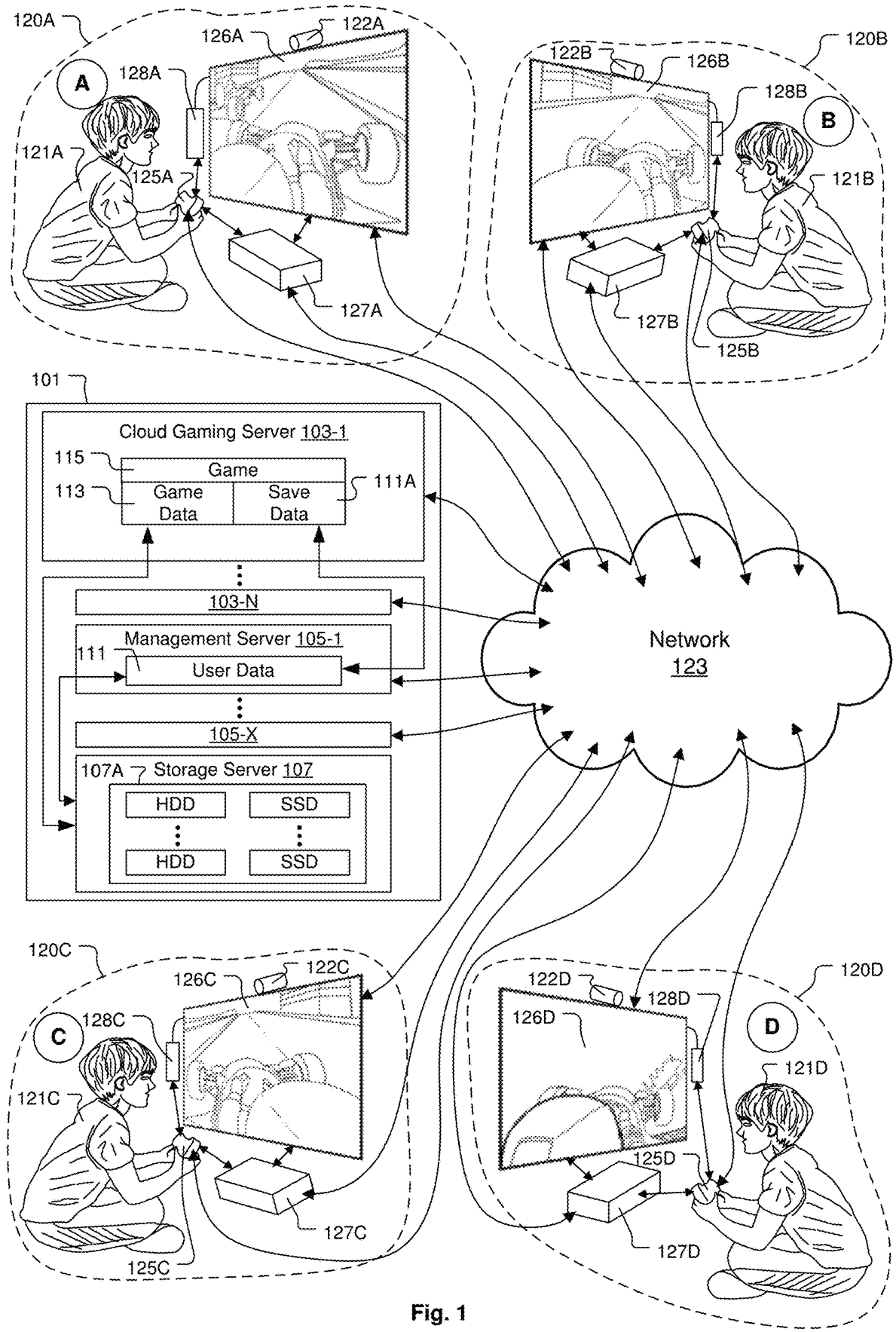
FIG. 1 shows a cloud gaming system, in accordance with some embodiments.

FIG. 1 shows a cloud gaming system 101, in accordance with some embodiments. The cloud gaming system 101 provides for play of online video games by one or more users/participants A, B, C, D (A-D). For example, FIG. 1 shows users/participants A-D playing an online video game provided by the cloud gaming system 101 over a network 123. Each of the users/participants A-D corresponds to a person 121A, 121B, 121C, and 121D (121A-121D), respectively, operating a corresponding local computing system 120A, 120B, 120C, and 120D (120A-120D), respectively. In this manner, FIG. 1 shows an example of group play by multiple users/participants A-D. While the example of FIG. 1 includes four users/participants A-D for purposes of description, it should be understood that there is no limitation on the number of users/participants that can participate in group play and/or spectating of the online video games provided by the cloud gaming system 101. The term online video game as used herein refers to a video game that is served by the cloud gaming system 101 to a client computing device, e.g., 120A-120D, for play and/or spectating by a user/participant on the client computing device. The online video game as referred to herein can be a single player video game or a multi-player video game. In some embodiments, each of the users/participants A-D is engaged in play of the online video game. In some embodiments, some of the users/participants A-D is/are engaged in play of the online video game, and some of the users/participants A-D is/are spectators watching others play the online video game.

In some embodiments, the cloud gaming system 101 is equipped to provide other media items in addition to providing for play of online video games. For example, in some embodiments, the cloud gaming system 101 provides an audio-visual presentation as a media item. In some embodiments, the audio-visual presentation provided by the cloud gaming system 101 is of one or more of a movie, a television show, a real-world sporting event, an electronic sporting event, an online show, an online video, and an uploaded video, among others. It should be understood that the cloud gaming system 101 is operable to provide essentially any type of media item that can be transmitted as a stream of digital data over a network for presentation and consumption (watching and/or listening to) by the users/participants A-D at their respective local computing systems 120A-120D. In various embodiment, the users/participants A-D watch the media item provided by cloud gaming system 101 as a group, such that the users/participants A-D participate in a group event. During the group event, the cloud gaming system 101 enables the users/participants A-D to provide participant-generated content so that the users/participants A-D can interact with each other and express their sentiments with regard to the media item that is being consumed. Again, the four users/participants A-D, as shown by way of example in FIG. 1, do not represent any limitation on the number of users/participants that can participate in the group event. It should be understood that there is no limitation on the number of users/participants that can participate in the group event provided by the cloud gaming system 101.

In some embodiments, the cloud gaming system 101 includes a number (N) of cloud gaming servers 103-1 to 103-N. In some embodiments, the number (N) of cloud gaming servers 103-1 to 103-N can be up to 100, or even more. In some embodiments, the cloud gaming system 101 also includes a number (X) of management servers 105-1 to 105-X and one or more storage server(s) 107. The storage server 107 includes a large number of data storage devices 107A, such as hard disk drives (HDDs) and/or solid state drives (SSDs). The storage server 107 stores video games that are available for play on the cloud gaming system 101. In some embodiments, the storage server 107 stores various media items that are available for provision by the cloud gaming system 101. In some embodiments, the management servers 105-1 to 105-X also have access to other cloud-based storage systems separate from the storage server 107, where the other cloud-based storage systems store video game data and/or media item data. Each management server 105-1 to 105-X is responsible for managing a cloud gaming session for the users/participants A-D. Also, in some embodiments, a given management server 105-1 to 105-X is responsible for simultaneously managing multiple cloud gaming sessions. In some embodiments, each management server 105-1 to 105-X operates to power on one or more cloud gaming servers 103-1 to 103-N when needed, load a requested video game from the storage server 107 or other cloud-based storage system to a given one of the cloud gaming servers 103-1 to 103-N, start execution of the requested video game on the given one of the cloud gaming servers 103-1 to 103-N, log the users/participants A-D into the given one of the cloud gaming servers 103-1 to 103-N, and mount user data 111 for the logged in users/participants A-D from the storage server 107 or other cloud-based storage system, among other operations.

In cloud gaming (or online gaming), the users/participants A-D operate their local computing systems 120A-120D to log into the cloud gaming system 101 over the network 123, such as the Internet, and play an online video game that is executed remotely on one or more of the cloud gaming servers 103-1 to 103-N. In some embodiments, the users/participants A-D log into the cloud gaming system 101 through one of the management servers 105-1 to 105-X. It should be understood, however, that there are various cloud services involved in logging in the users/participants A-D. For example, there are cloud services involved for authenticating the users/participants A-D, for ensuring that the users/participants A-D have an Internet connection of sufficient quality, and for finding an available cloud gaming server 103-1 to 103-N near each of the users/participants A-D into which the users/participants A-D can log in.

In some embodiments, the local computing systems 120A-120D include a corresponding game controller 125A, 125B, 125C, 125D (125A-125D), and a corresponding display device 126A, 126B, 126C, 126D (126A-126D), such as a television or monitor. In some embodiments, the local computing systems 120A-120D include a corresponding dongle 128A, 128B, 128C, 128D (128A-128D) connected to the corresponding display device 126A-126D, where the dongles 128A-128D are configured to enable data communication between the corresponding game controller 125A-125D and the corresponding display device 126A-126D, such that a network interface controller (NIC) of the display devices 126A-126D can be used to transmit signals from the game controllers 125A-125D to the network 123.

In some embodiments, the local computing systems 120A-120D also include a corresponding local game console 127A, 127B, 127C, 127D (127A-127D). In these embodiments, signals generated by the game controllers 125A-125D can be transmitted through the corresponding local game console 127A-127D to the network 123 using a NIC of the corresponding local game console 127A-127D. Also, in some embodiments, the game controllers 125A-125D can communicate signals directly to the network 123 through a local area network, such as a WIFI network. Also, in some embodiments, the local computing systems 120A-120D include a corresponding camera 122A, 122B, 122C, 122D (122A-122D) for capturing still-images, video, and/or audio of the users/participants A-D and/or of the environment within which the users/participants A-D reside. The content captured by the cameras 122A-122D can be transmitted through the corresponding local game console 127A-127D to the network 123 using the NIC of the corresponding local game console 127A-127D.

Also, in some embodiments, the users/participants A-D can play the online video game on a local computing device other than the local computing system 120A-120D. For example, in some embodiments, any of the users/participants A-D can play the online video game on a mobile computing device, such a cell phone, tablet, laptop, smart car system, among others. Also, in some embodiments, the users/participants A-D can play the online video game on a desktop computing system. For ease of description, reference to the local computing systems 120A-120D herein also conveys reference to any other computing device on which the users/participants A-D can play the online video game and/or consume (watch and/or listen to) a media item provided by the cloud gaming system 101.

Additionally, in various embodiments, data (such as video stream data or audio data or haptic feedback data) is communicated from the cloud gaming system 101 through the network 123 to the local computing systems 120A-120D. In some embodiments, data is communicated from the cloud gaming system 101 through the network 123 to the display devices 126A-126D. In some embodiments, data is communicated from the cloud gaming system 101 through the network 123 to the local game consoles 127A-127D, and from the local game consoles 127A-127D to the corresponding display devices 126A-126D. Also, in some embodiments, data is communicated from the cloud gaming system 101 through the network 123 to the game controllers 125A-125D.

During game play, the users/participants A-D generate game commands that are transmitted through the network 123 to the cloud gaming server 103-1 to 103-N. In some embodiments, the users/participants A-D use the game controllers 125A-125D to generate the game commands, which are transmitted in signal form from the game controllers 125A-125D to the network 123 and on to the cloud gaming server 103-1 to 103-N. In some embodiments, the game commands are transmitted in signal form from the game controllers 125A-125D to the corresponding local game consoles 127A-127D or to the corresponding display device 126A-126D, from which the game commands are transmitted through the network 123 to the cloud gaming server 103-1 to 103-N. In various embodiments, the transmission of game commands in signal form from the game controllers 125A-125D to the network 123 can be done over a wired network connection or a wireless network connection, or a combination thereof. The cloud gaming server 103-1 to 103-N executes the video game in accordance with the game commands received from the users/participants A-D to generate one or more video stream(s) reflecting the play of the video game by the users/participants A-D. The video stream(s) is/are transmitted from the cloud gaming server 103-1 to 103-N through the network 123 to the local computing systems 120A-120D of the users/participants A-D for display on the corresponding display devices 126A-126D.

The cloud gaming server 103-1 to 103-N loads game data 113 and game executables 115 from the storage server 107 or other cloud-based storage system. Also, in some embodiments, the cloud gaming server 103-1 to 103-N loads the user data 111 from the storage server 107 or other cloud-based storage system to the management server 105-1 to 105-X. Modern video games generate large amounts of user data 111. Depending on the video game and the video game platform (video game console), there can be many different types of user data 111 generated for a video game for a given users/participants A-D. For example, in some embodiments, user data 111 includes save data 111A for the users/participants A-D, download data for the users/participants A-D, recording data for the users/participants A-D (which is a recording of the user's/participant's game play in a buffer or for an amount of time most recently played), trophy data for the users/participants A-D, profile data for the users/participants A-D, video data for the users/participants A-D, audio data for the users/participants A-D, suspend and resume data for the users/participants A-D (which captures the entire state of the online gaming system at a particular time), among other types of data for the users/participants A-D. Save data 111A is a part of user data 111 and is usually a data image for a video game that includes all of the data about the game state and the user's/participant's state within the game at a particular save time. As the video game is played by the users/participants A-D, there can be many save data 111A images created for the users/participants A-D. For example, in some embodiments, save data 111A for the users/participants A-D is generated at particular points during game play, such as when transitioning from one level to another, or when changing from one scene to another, among many other times/instances at which generation of save data 111A is triggered. Also, in some embodiments, generation of save data 111A is triggered through menu selection by the users/participants A-D.

Figure 2:
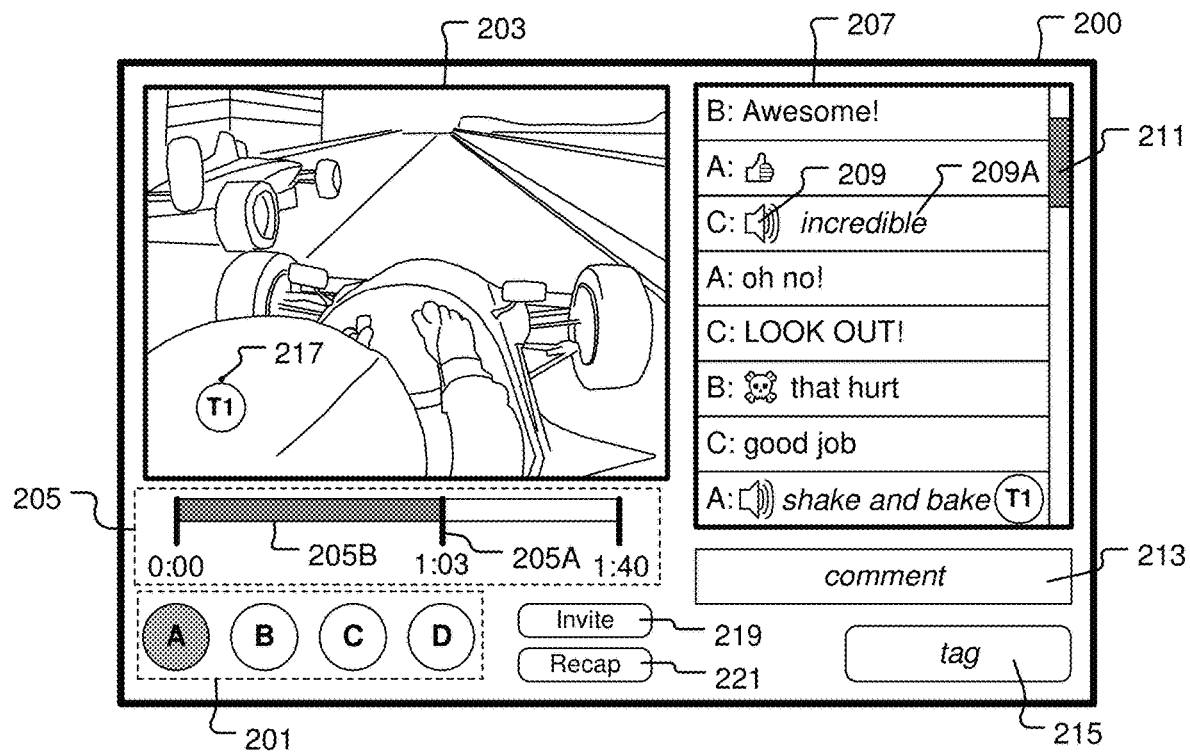
FIG. 2 shows an example user interface displayed on a display device for a user/participant during play of an online video game provided by the cloud gaming system, in accordance with some embodiments.

FIG. 2 shows an example user interface 200 displayed on the display device 126A for user/participant A during play of an online video game provided by the cloud gaming system 101, in accordance with some embodiments. The user interface 200 includes a player identification section 201 that shows which users are currently participating in the online video game as either a player or as a spectator. The player identification section 201 shows that users/participants A-D are currently participating in the online video game, and uniquely marks (with shading, by way of example) the identifier of user/participant A to indicate that the user interface 200 is currently being provided for user/participant A, based on the game play or spectating settings for user/participant A. The user interface 200 includes a video display area 203 in which game video is displayed that corresponds to the current play/spectating of the online game by user/participant A. The user interface 200 also includes a time display 205 that provides an indication of a time mark 205A corresponding to the game video currently displayed in the video display area 203, where the time mark 205A is shown on a time bar 205B that represents a time scale for the expected duration of the online gaming event.

The user interface 200 also includes a communication display area 207 in which various communications provided by the users/participants A-D are displayed. In various embodiments, the communication display area 207 is equipped to present (display and/or link to) essentially any type of user communication (participant-generated content), such as text data, voice data, audio data, emoticon data, image data, camera-captured video data, camera-captured image data, tag data, and controller device input data, among other types of communication data. In some embodiments, each item presented within the communication display area 207 is presented in conjunction with the identifier by the user/participant A-D that contributed the communication. In some embodiments, links to audio, video, and image content are activatable from within the communication display area 207. For example, in some embodiments, a selection of the audio link 209 will cause a corresponding audio file to play. Also, in some embodiments, audio communications are auto-transcribed into text messages by the cloud gaming system 101, and the auto-transcribed text messages are shown in the communication display area 207, as exemplified by the text message 209A corresponding to the audio link 209. A scroll control 211 is provided for navigating through the content displayed within the communication display area 207. In some embodiments, the items presented within the communication display area 207 are time-indexed to the game video displayed in the video display area 203. In some embodiments, the user interface 200 also includes a user communication input control 213 that enables the users/participants A-D to provide content for display within the communication display area 207, where the content is specification of one or more of text, audio, video, emoticon, and image data, among other types of content.

The user interface 200 also includes a tagging control 215 that enables the users/participants A-D to place tags on the video displayed in the video display area 203. In some embodiments, selection of tag control 215 initiates a process in which the user/participant A-D selects a location within the video display area 203 to place a tag. In various embodiments, the tag has some associated content that is one or more of text, audio, video, emoticon, and image data, among others. The tag is placed at a user-selected pixel location within the video that is displayed in the video display area 203. The tag is correlated to the user-selected pixel location. The tag is also time-indexed to the video that is displayed in the video display area 203 when the tag is placed. In some embodiments, the tag is time-indexed to a set of video frames, such that the tag appears during display of video frames within the set of video frames to which the tag is time-indexed. In some embodiments, selection of the tagging control 215 freezes the video currently shown in the video display area 203 to enable the user/participant A-D to specify the content of the tag. However, in some embodiments, selection of the tagging control 215 does not freeze the video currently shown in the video display area 203 as the user/participant A-D specifies the content of the tag. Also, in some embodiments, the time display 205 is configured to enable the user/participant A-D to select and move the time mark 205A along the time bar 205B in order to display a desired frame of the video within the video display area 203 on which the tag is to be placed. In some embodiments, insertion of a tag by a user/participant A-D is indicated within the communication display area 207. For example, FIG. 2 shows the tag T1 as input by the user/participant A in the communication display area 207, where the tag T1 is correlated to a pixel location 217 within the video currently displayed in the video display area 203, and where the tag T1 has audio content. In some embodiments, selection of the tag in the video display area 203 and/or in the communication display area 207 will trigger display/playback of the content of the tag. For example, selection of the tag T1 in the video display area 203 will cause play back of the audio content of tag T1.

In some embodiments, the user interface 200 also includes an invitation control 219 that enables the user/participant A-D to invite another person to join in the group playing event (multi-player online game) and/or group watching event that is currently underway within the user interface 200. In some embodiments, selection of the invitation control 219 enables the user/participant A-D to specify an identifier of the person that is to be invited to join and/or to send an email, text message, or other type of message inviting the person to join. In some embodiments, when the new user/participant joins the group playing event (multi-player online game) and/or group watching event that is currently underway within the user interface 200, the new user/participant may desire to watch a recap of the group playing event (multi-player online game) and/or group watching event to get up to speed on what has happened and is happening. In this regard, the user interface 200 includes a recap request control 221, that when selected triggers a process for providing a audio-visual recap to the recap requestor from a dynamic summary queue that is generated on the cloud gaming system 101.

Figure 3:
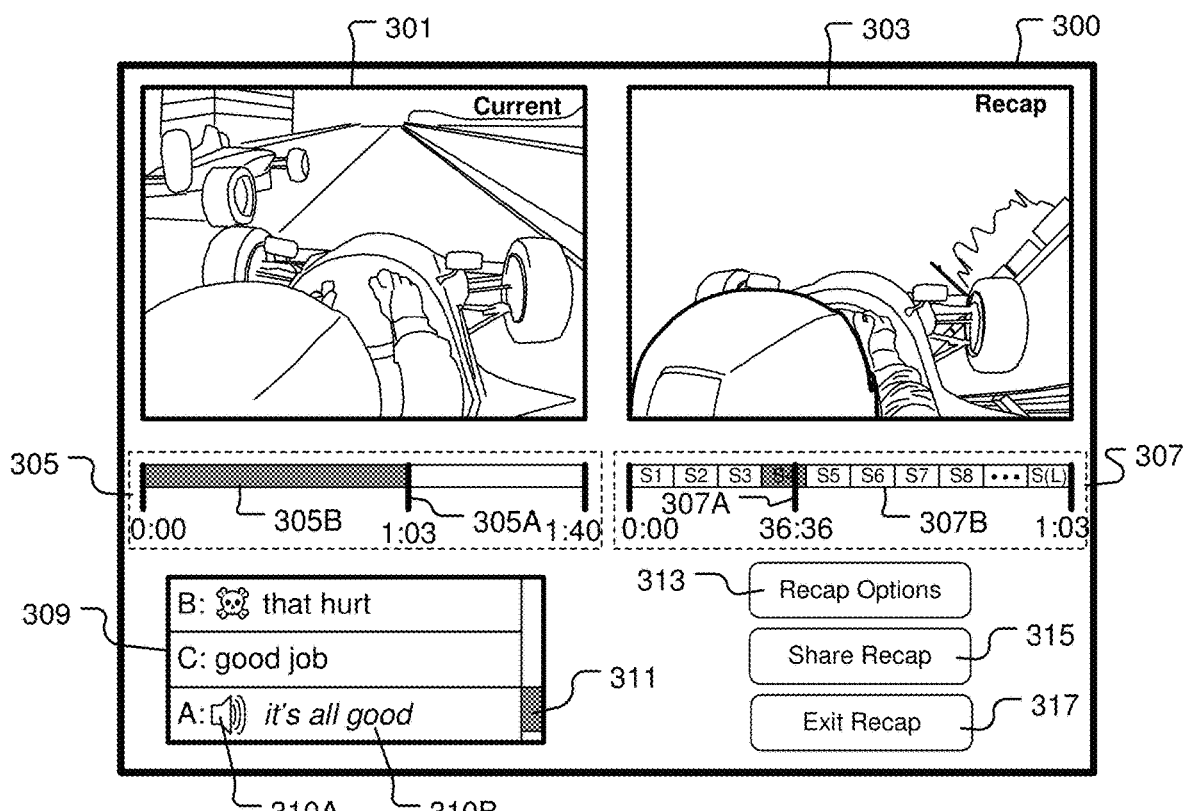
FIG. 3 shows an example user interface displayed on a display device for a user/participant upon selection of the recap request control, in accordance with some embodiments.

FIG. 3 shows an example user interface 300 displayed on the display device 126D for a user/participant A-D upon selection of the recap request control 221, in accordance with some embodiments. In some embodiments, the user interface 300 includes a video display area 301 in which game video is displayed that corresponds to the current play of the online game by one or more of the other users/participants A-C who did not request the recap. The user interface 300 also includes a time display 305 that provides an indication of a time mark 305A corresponding to the game video currently displayed in the video display area 301, where the time mark 305A is shown on a time bar 305B that represents a time scale for the expected duration of the online gaming event.

The user interface 300 includes a video display area 303 in which the audio-visual recap of the group playing event (multi-player online game) and/or group watching event is presented to the recap requestor from the dynamic summary queue that is generated on the cloud gaming system 101. The user interface 300 also includes a time display 307 that provides an indication of a time mark 307A corresponding to the recap content currently displayed in the video display area 303, where the time mark 307A is shown on a time bar 307B that represents a time scale for the current content of the dynamic summary queue on the cloud gaming system 101. In some embodiments, the time mark 307A is draggable along the time bar 307B to enable navigation by the user through the content of the dynamic summary queue. In some embodiments, the time bar 307B is delineated into segments S1-S(L), where L is any integer number greater than zero. Each of the segments S1-S(L) corresponds to a continuous portion of the timeline of the historical content of the group playing event (multi-player online game) and/or group watching event. In some embodiments, the user interface 300 includes the video display area 303 and time display 307, but not the video display area 301 and video display area 305.

The user interface 300 also includes a communication display area 309 for displaying various historical user/participant-provided content associated with the dynamic summary queue (recap) content that is currently or recently displayed in the video display area 303. In various embodiments, the communication display area 309 is equipped to present (display and/or link to) essentially any type of user/participant-provided content (participant-generated content), such as text data, voice data, audio data, emoticon data, image data, camera-captured video data, camera-captured image data, tag data, and controller device input data, among other types of content data. In some embodiments, each item of content presented within the communication display area 309 is presented in conjunction with the identifier of the user/participant A-D that contributed the content. In some embodiments, links to audio, video, and image content are activatable from within the communication display area 309. For example, in some embodiments, a selection of the audio link 310A will cause a corresponding audio file to play. Also, in some embodiments, audio communications are auto-transcribed into text messages by the cloud gaming system 101, and the auto-transcribed text messages are shown in the communication display area 309, as exemplified by the text message 310B corresponding to the audio link 310A. A scroll control 311 is provided for navigating through the user/participant-provided content within the communication display area 309. In some embodiments, the user/participant-provided content items presented within the communication display area 309 are time-indexed to the content of the dynamic summary queue (recap) that is displayed in the video display area 303.

Also, in some embodiments, the dynamic summary queue can be shared with another user/participant by selecting a share recap control 315 provided within the user interface 300. For example, in some embodiments, selection of the share recap control 315 triggers an interface through which an identifier can be selected for a person to whom the dynamic summary queue is to be shared. In some embodiments, selection of the share recap control 315 triggers an interface through which an email and/or message is transmitted to a person to whom the dynamic summary queue is to be shared. In some embodiments, sharing of the dynamic summary queue is done in a private and/or anonymous manner, such that identities of the users/participants of the group playing event (multi-player online game) and/or group watching event are kept secret. In some embodiments, the user interface 300 also includes an exit recap control 317 that when selected will close the user interface 300 and return the user/participant to another user interface, such as the user interface 200 of FIG. 2.

Generation of the dynamic summary queue on the cloud gaming system 101 and provision of the dynamic summary queue to a requestor enables the requestor, who is late in joining the online group event (online video game or presentation of media item), to get up to speed quickly on what has happened during the online group event. Also, it should be understood that the content of the dynamic summary queue is selected/generated based on historical input content provided by the other users/participants within the group during the group event. In this manner, the content of the dynamic summary queue is reflective of the historical thoughts and actions of the other users/participants within the group during the group event. Also, it should be understood that while the examples of FIGS. 1-3 are described primarily within the context of group play of an online video game, the principles of dynamic summary queue generation and provision disclosed herein are equally applicable to multi-user/participant online consumption (watching and/or listening to) of essentially any type of media item. Therefore, in some embodiments, the media item for which the dynamic summary queue is generated is a stream of game video and audio of a video game. And, in some embodiments, the media item for which the dynamic summary queue is generated is an audio-visual presentation, where the audio-visual presentation is of one or more of a movie, a television show, a real-world sporting event, an electronic sporting event, an online show, an online video, and/or an uploaded video, among essentially any other type of audio-visual presentation. In describing the generation and provision of the dynamic summary queue below, the term "media item" is used to refer to the content for which the dynamic summary queue is generated.

Figure 4:
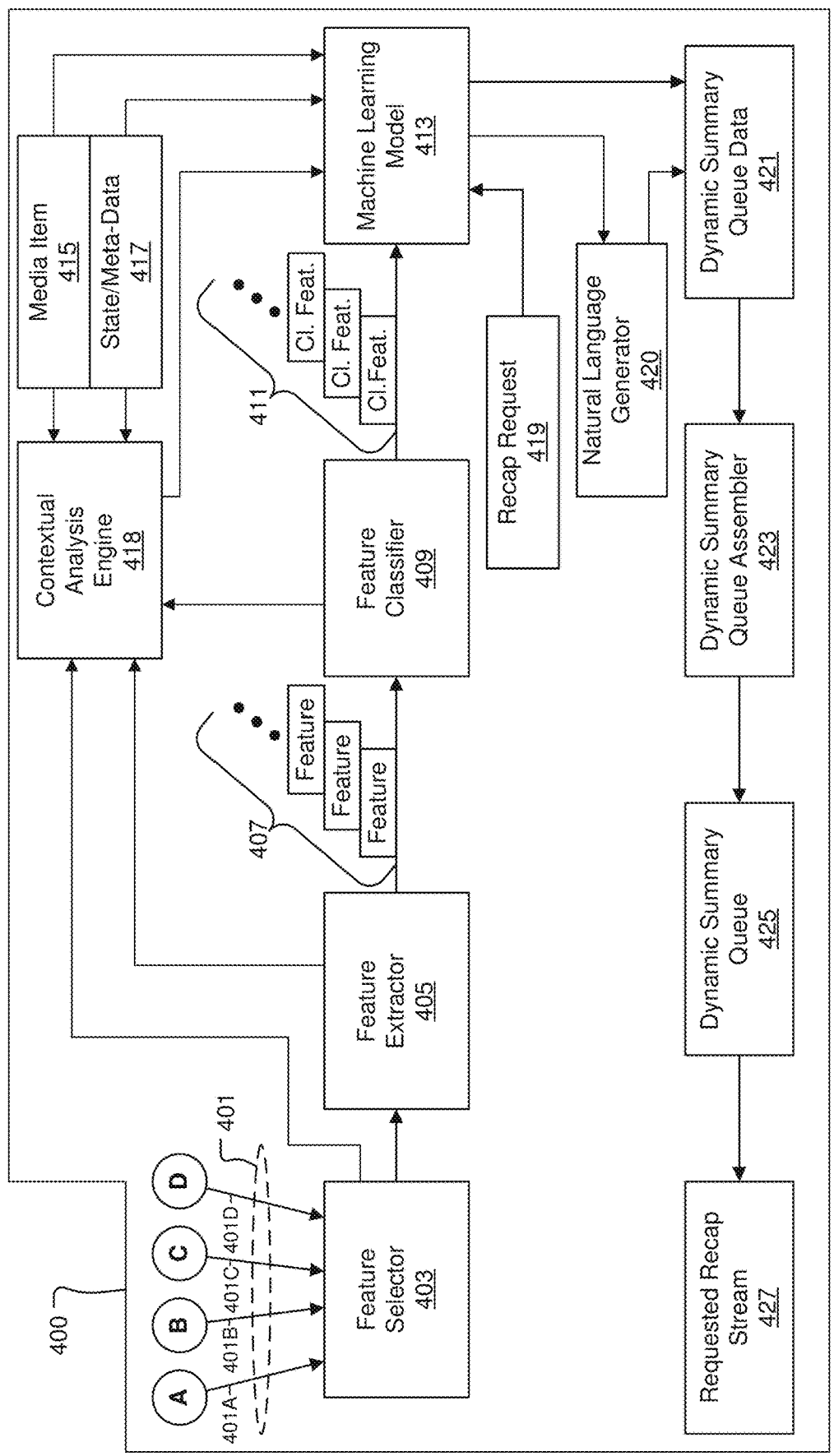
FIG. 4 shows a diagram of a system for generating and providing a dynamic summary queue for a media item, in accordance with some embodiments.

FIG. 4 shows a diagram of a system 400 for generating and providing a dynamic summary queue 425 for a media item 415, in accordance with some embodiments. As the media item 415 is consumed (watched and/or listened to) by the user/participants A-D within the online group event, the different users/participants A-D generate respective input channels 401A, 401B, 401C, 401D (401A-401D) as a function of time. The input channels 401A-401D are collectively referred to as input channels 401. The input channels 401 include various types of user/participant-generated content provided by the users/participants A-D as they consumed the media item 415. In various embodiments, the types of user/participant-generated content within the input channels 401 include one or more of text data, voice data, audio data, emoticon data, image data, camera-captured video data, camera-captured image data, tag data, and controller device input data, among essentially any other type of data that can be associated with a given user/participant A-D as they consumed the media item 415. In various embodiments, the users/participants A-D within the group can provide essentially any type of input and associate that input with the media item 415 and/or with a particular feature within the media item 415, at a particular time on the timeline of the media item 415. For example, in some embodiments, the input channels 401 can include a chat stream in which the users/participants A-D provide input as a function of time as the media item 415 is consumed, where the user/participant-generated input is time-indexed to the timeline of the media item 415. Because the input channels 401 are generated by the users/participants A-D as they consume the media item 415, a temporal correlation exists between each item of content within the input channels 401 and the timeline of the media item 415. In some embodiments, the input channels 401 include camera-captured images and/or video of the user/participants A-D themselves, which can be analyzed within the system 400 to obtain input information, such as reactions, facial expressions, and gestures, among other types of input information.

The system 400 operates to analyze the content of the input channels 401 as a function of time to obtain/determine information about which portions of the media item 415 are to be included within a dynamic summary queue 425 as a function of time. The input channels 401 provided by the users/participants A-D within the group are analyzed within the context of the media item 415 to determine what parts of the media item 415 are more relevant than others, so that these more relevant parts of the media item 415 are identified for inclusion in the dynamic summary queue 425. Also, the system 400 operates to analyze the content of the media item 415 itself as a function of time to obtain/determine information about which portions of the media item 415 are to be included within the dynamic summary queue 425 as a function of time. Also, in some embodiments, state-data and/or meta-data (state/meta-data 417) of the media item 415 is analyzed as a function of time to obtain/determine information about which portions of the media item 415 are to be included within the dynamic summary queue 425 as a function of time.

The dynamic summary queue 425 includes the parts of the media item 415 that the users/participants A-D within the group thought were most relevant based on analysis of the content of the input channels 401 provided by the users/participants A-D within the group. Therefore, the dynamic summary queue 425 for the media item 415 enables a new user/participant A-D within the group to get up to speed quickly, by showing portions of the media item 415 that are deemed to be relevant based on analysis of the input channels 401 provided by the other users/participants A-D within the group as they participated in consuming the media item 415 before the new user/participant A-D arrived to the group. The dynamic summary queue 425 is always being dynamically generated. The content of the dynamic summary queue 425 is based on processing of the content of the input channels 401 provided by the users/participants A-D within the group as a function of time, where the content of the input channels 401 is subject to change as a function of time, and where the make-up of the users/participants A-D within the group is subject to change as a function of time. Therefore, if the content within the input channels 401 provided by the users/participants A-D within the group changes, then the content of the dynamic summary queue 425 is subject to change (is dynamic). For example, if the content of the input channels 401 includes a change in behaviors, statements, expressions, reactions, sentiments, personality, etc., of the users/participants A-D within the group that occurs later in the timeline of the media item 415, that change can be used to update the content of the dynamic summary queue 425 that was previously determined based on content of the input channels 401 as received earlier in the timeline of the media item 415. Therefore, in some embodiments, the dynamic summary queue 425 is dynamic in the sense that content already placed in the dynamic summary queue 425 is subject to change based on information that is later received within the input channels 401.

In some embodiments, the input channels 401 are processed through a feature selector 403 to select features from the input channels 401. In some embodiments, the feature selector 403 is an algorithm/program executed on a computing system that automatically parses the input channels 401 in real-time to select features from the input channels 401 as the data that defines the input channels 401 is received by the system 400. The features selected from the input channels 401 are various types of input that convey information about how the users/participants A-D respond to the media item 415 as it is consumed by the user/participants A-D. In various embodiments, features include the user/participant-generated content within the input channels 401, such as one or more of text data, voice data, audio data, emoticon data, image data, camera-captured video data, camera-captured image data, tag data, and controller device input data, among essentially any other type of data that can be associated with a given user/participant A-D as they consumed the media item 415. In some embodiments, the feature selector 403 operates to remove input items within the input channels 401 that are redundant and/or irrelevant to determining how the users/participants A-D responded to the media item 415 as it was consumed by the user/participants A-D.

Features selected from the input channels 401 by the feature selector 403 are provided as input features to a feature extractor 405 that operates to extract/derive new features from the input features, where these new features are referred to as extracted features 407. In some embodiments, the feature extractor 405 is an algorithm/program executed on a computing system that automatically extracts/derives features in real-time from the input features that are received from the feature selector 403. In some embodiments, the extracted features are defined to be informative of how the users/participants A-D responded to the media item 415 as it was consumed by the user/participants A-D. Also, in some embodiments, the extracted features are defined so as to not be redundant. In some embodiments, the extracted features 407 collectively represent a real-time dynamic consolidation of the information received in the input channels 401 from the user/participants A-D during their consumption of the media item 415.

In some embodiments, the extracted features 407 are provided as input to a feature classifier 409 that operates to determine to which of multiple categories the extracted features 407 belong. In some embodiments, information on the categorical attributes of the extracted features 407 is attached to the extracted features 407 to generate a set of classified features 411 that is provided as input to a machine learning model 413. The machine learning model 413 is an algorithm/program executed on a computing system that automatically determines which portions of the media item 415 and/or which portions of the information within the input channels 401 are to be included within the dynamic summary queue 425. In some embodiments, the machine learning model 413 is a requestor system that implements a content-based filtering algorithm and/or a collaborative filtering algorithm and/or other approach for determining which portions of the media item 415 and/or which portions of the information within the input channels 401 were considered of higher relevance by the users/participants A-D as they consumed the media item 415. In some embodiments, the media item 415 and the state/meta-data 417 for the media item 415 are provided as input to the machine learning model 413.

Also, in some embodiments, the system 400 includes a contextual analysis engine 418 implemented as an algorithm/program executed on a computing system that automatically determines/identifies a context associated with one or more of the media item 415, the state/meta-data 417 for the media item 415, the features selected from the input channels 401 by the features selector 403, the extracted features 407 output by the feature extractor 405, and the set of classified features 411 output by the feature classifier 409. In various embodiments, the context determined/identified for a given piece or set of information by the context analysis engine 418 is provided as input to the machine learning model 413. For example, in some embodiments, the context determined/identified for a given piece or set of information by the context analysis engine 418 is a description or characterization of a particular portion of the media item 415, such as a particular scene within the media item 415.

It should be understood that the feature selector 403, the feature extractor 405, the feature classifier 409, the contextual analysis engine 418, and the machine learning model 413 represent an example embodiment of the system 400. In other embodiments, the system 400 can implement essentially any type of machine learning approach that functions to identify which portions of the media item 415 are considered to be of higher relevance to the users/participants A-D of the group based on the user/participant-generated input provided in the input channels 401 during consumption of the media item 415 by the user/participants A-D. Regardless of the particular type of machine learning approach that is implemented by the system 400, in some embodiments, the machine learning model 413 is able to be queried to generate a recommendation of content for inclusion with the dynamic summary queue 425. In some embodiments, the machine learning model 413 receives a recap request 419 that triggers a query of the machine learning model 413 to generate a recommendation of content for inclusion with the dynamic summary queue 425 based on user/participant-generated information provided in the input channels 401 during consumption of the media item 415 by the users/participants A-D. In some embodiments, the recap request 419 is triggered upon selection of the recap request control 221 in FIG. 2.

The system 400 operates to gather/compile dynamic summary queue data 421 corresponding to the recommendation of content for inclusion with the dynamic summary queue 425 generated by the machine learning model 413. In some embodiments, the dynamic summary queue data 421 includes video and/or audio data of various portions of the media item 415. Also, in some embodiments, the dynamic summary queue data 421 further includes some of the information received in the input channels 401 that correspond to the portions of the media item 415 that are included within the dynamic summary queue 425. Also, in some embodiments, the system 400 includes a natural language generator 420 that operates to create a computer-generated natural language textual and/or audio/verbal summary of one or more portions of the media item 415 that are included within the dynamic summary queue 425. In some embodiments, the natural language generator 420 is an algorithm/program executed on a computing system that receives input data from the machine learning model 413 specifying the information that is to be summarized, and that generates the natural language textual and/or audio summary of the received input data.

The dynamic summary queue data 421 is provided to a dynamic summary queue assembler 423 that operates to assemble the dynamic summary queue data 421 into the dynamic summary queue 425. Also, the system 400 is configured to transmit the content of the dynamic summary queue 425 as a requested recap stream 427 to the computer system of the requestor from whom the recap request 419 was received. In some embodiments, the requested recap stream 427 is a video stream that includes video and audio data. In some embodiments, the system 400 is configured to encode the requested recap stream 427 prior to transmission over the Internet to the computer system of the requestor. In various embodiments, the system 400 can implement essentially any technology for transmission of data over the Internet to provide for transmission of the requested recap stream 427 to the computer system of the requestor. In some embodiments, the requested recap stream 427 is shown in the video display area 303 of the user interface 300 of FIG. 4.

The content of the dynamic summary queue 425 at a given time is a function of the inputs provided to the machine learning model 413. In some embodiments, the requestor of the dynamic summary queue 425 is provided with an ability to customize generation of the dynamic summary queue 425. For example, with reference to FIG. 3, in some embodiments the user interface 300 includes a recap options control 313 that when selected will trigger display of a user interface that enables the requestor of the dynamic summary queue 425 to customize various options for generation of the dynamic summary queue 425.

FIG. 5A shows an example user interface 500 that provides various controls for allowing the requestor of the dynamic summary queue 425 to customize how the dynamic summary queue 425 is generated, in accordance with some embodiments. In some embodiments, the user interface 500 is displayed when the user/participant A-D selects the recap options control 313. In some embodiments, the recap options user interface 500 provides one or more of a participant basis control 501, a time window control 503, a recap resolution control 505, an event types control 507, and an indication types control 509, which are collectively referred to as recap options. In some embodiments, the user interface 500 provides an indication of the current setting for each of the recap options. Also, in some embodiments, the user interface 500 provides a respective "Change" control for each of the recap options, that when selected will trigger display of another user interface for changing the current setting of the corresponding recap option. Also, in some embodiments, the user interface 500 provides a respective "Reset" control for each of the recap options, that when selected will cause the corresponding recap option to reset to a default setting.

FIG. 5B shows an example of a user interface 511 that is displayed when the "Change" control is selected within the participant basis control 501 in the user interface 500 of FIG. 5A, in accordance with some embodiments. The user interface 511 enables the requestor of the dynamic summary queue 425 (recap) to select which users/participants A-D within the group are to be used as input sources for generating the dynamic summary queue 425. In some embodiments, the user interface 511 includes a change control 513 for each of the users/participants A-D that when selected will toggle the current participant basis setting for the user/participant A-D between "include" and "exclude." When a given user/participant A-D has the current participant basis setting of "include," the input channel 401 associated with the given user/participant A-D will be used by the system 400 in generating the dynamic summary queue 425. Conversely, when a given user/participant A-D has the current participant basis setting of "exclude," the input channel 401 associated with the given user/participant A-D will not be used by the system 400 in generating the dynamic summary queue 425. Therefore, by using the participant basis control 501, the requestor of the dynamic summary queue 425 is able to customize which user/participant A-D input channels 401 are used as a basis for generating the dynamic summary queue 425.

For example, if the requestor of the dynamic summary queue 425 knows that they have similar interests and/or tastes as user/participants A and C, but the requestor does not know users/participants B and D, the requestor can use the participant basis control 501 to "include" user/participants A and C and "exclude" users/participants B and D in generating the dynamic summary queue 425, as shown in the example of FIG. 5B. In this manner, the requestor of the dynamic summary queue 425 can have confidence the content of the dynamic summary queue 425 will be more aligned with their own interests and/or tastes. In another example, if the requestor of the dynamic summary queue 425 does not know the users/participants A-D within the group, the requestor can use the participant basis control 501 to "include" all users/participants A-D so that when the requestor watches the dynamic summary queue 425, the requestor can not only get up to speed on the media item 415, but can also determine whether or not the interests and/or tastes of the users/participants A-D within the group aligns with their own interests and/or tastes, so that the requestor of the dynamic summary queue 425 can make an informed determination about whether or not they want to participate with the users/participants A-D in the group event. In some embodiments, a default setting of the participant basis control 501 is to "include" all users/participants A-D within the group, so that all input channels 401A-401D are used in generating the dynamic summary queue 425.

Figure 5C:
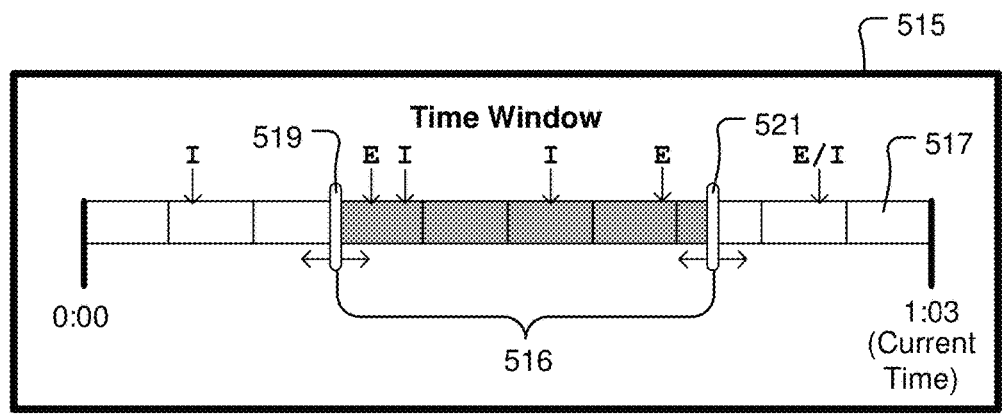
FIG. 5C shows an example of a user interface that is displayed when the "Change" control is selected within the time window control in the user interface of FIG. 5A, in accordance with some embodiments.

FIG. 5C shows an example of a user interface 515 that is displayed when the "Change" control is selected within the time window control 503 in the user interface 500 of FIG. 5A, in accordance with some embodiments. The time window control 503 enables the requestor of the dynamic summary queue 425 to select a window of time along the timeline of the media item 415 over which the dynamic summary queue 425 is to be generated. In some embodiments, the time window control 503 enables the user to select a time window 516 for generation of the dynamic summary queue 425 that is within an overall time range extending from the beginning of the timeline of the media item 415 (time 0:00) to a current time of live playback of the media item 415 that is underway to the group of users/participants A-D. In some embodiments, the time window control 503 provides a time bar 517 representing the overall time range within which the time window 516 for generation of the dynamic summary queue 425 can be set. Also, in some embodiments, the time window control 503 includes a first slider control 519 that is slidable along the time bar 517 by the requestor to set a start time along the timeline of the media item 415 for the time window 516 that is to be used in generating the dynamic summary queue 425. And, in some embodiments, the time window control 503 includes a second slider control 521 that is slidable along the time bar 517 by the requestor to set an end time along the timeline of the media item 415 for the time window 516 that is to be used in generating the dynamic summary queue 425. In this manner, the dynamic summary queue 425 will be generated over the time window 516 along the timeline of the media item 415 that extends from the start time corresponding to the setting of the first slider control 519 to the end time corresponding to the setting of the second slider control 521.

Also, in some embodiments, the time window control 503 provides an indication of temporal locations where indications of interest (I) and/or events of interest (E) may exist along the timeline of the media item 415 based on the input channels 401 associated with the users/participants A-D that are currently included in generating the dynamic summary queue 425, as currently set by the participant basis control 501. The temporal locations where indications of interest (I) and/or events of interest (E) may exist along the timeline of the media item 415 can be used by the requestor as an aid in identifying which parts of the media item 415 are more desirable for inclusion within the time window 516 for generation of the dynamic summary queue 425. In some embodiments, when the second slider control 521 is set to the current time of live playback of the media item 415, the system 400 operates to continue adding content to dynamic summary queue 425 as the dynamic summary queue 425 is streamed to the requestor, so that when the requestor gets to the end of the dynamic summary queue 425, the requestor is at the current time of live playback of the media item 415. Also, in some embodiments, when the requestor gets to the end of the dynamic summary queue 425, the requestor jumps right into viewing the live playback of the media item 415 along with the other users/participants A-D within the group. For example, when the requestor gets to the end of the dynamic summary queue 425, the user interface that is currently shown to the requestor automatically changes from the user interface 300 of FIG. 3 to the user interface 200 of FIG. 2.

Figure 5D:
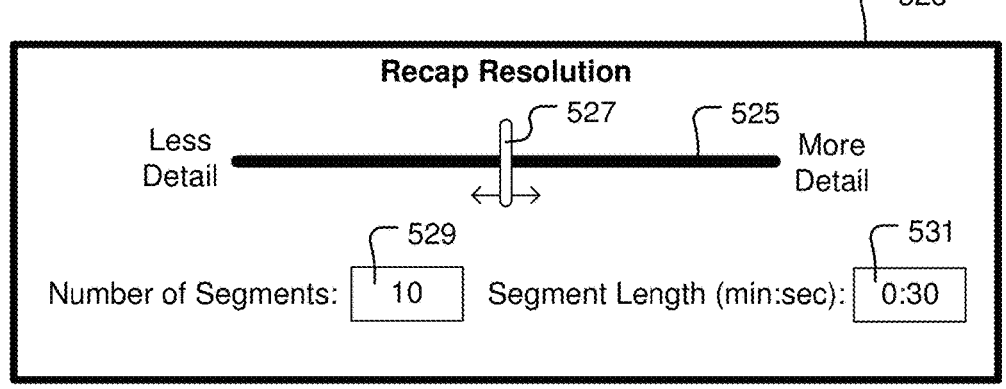
FIG. 5D shows an example of a user interface that is displayed when the "Change" control is selected within the recap resolution control in the user interface of FIG. 5A, in accordance with some embodiments.

FIG. 5D shows an example of a user interface 523 that is displayed when the "Change" control is selected within the recap resolution control 505 in the user interface 500 of FIG. 5A, in accordance with some embodiments. The recap resolution control 505 enables the requestor to set a content resolution of the dynamic summary queue 425 to control how much content is included within the dynamic summary queue 425. In some embodiments, the user interface 523 includes a resolution bar 525 and a slider control 527 that is slidable by the requestor along the resolution bar 525. Positioning of the slider control 527 toward the "Less Detail" end of the resolution bar 525 will cause the dynamic summary queue 425 to be generated with less content (to be shorter). Conversely, positioning of the slider control 527 toward the "More Detail" end of the resolution bar 525 will cause the dynamic summary queue 425 to be generated with more content (to be longer). Also, in some embodiments, the user interface 523 includes a field 529 in which the requestor can enter an integer value indicating a number of segments (or a maximum number of segments) that are to be included within the dynamic summary queue 425, where a segment corresponds to a continuous portion of the playback timeline of the media item 415. Also, in some embodiments, the user interface 523 includes a field 531 in which the requestor can enter a time length (or a maximum time length) that is to be used for each segment within the dynamic summary queue 425.

Figure 5E:
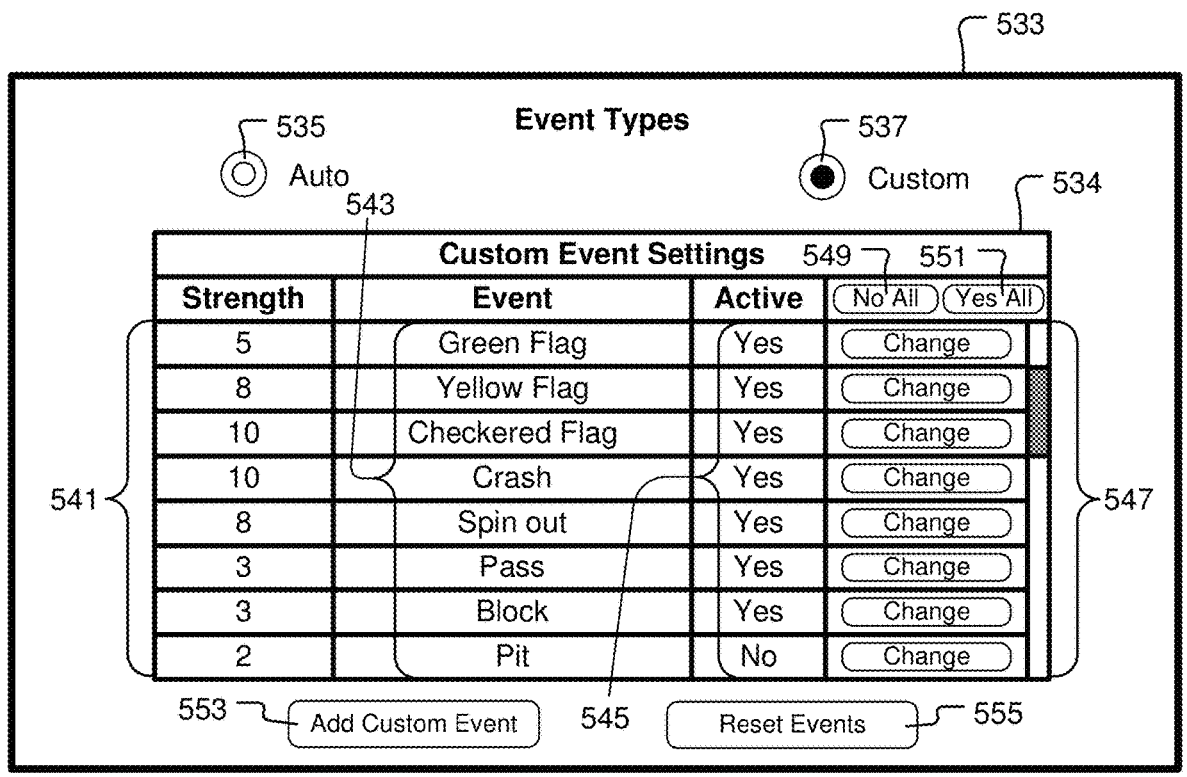
FIG. 5E shows an example of a user interface that is displayed when the "Change" control is selected within the event types control in the user interface of FIG. 5A, in accordance with some embodiments.

FIG. 5E shows an example of a user interface 533 that is displayed when the "Change" control is selected within the event types control 507 in the user interface 500 of FIG. 5A, in accordance with some embodiments. The event types control 507 enables the requestor of the dynamic summary queue 425 to specify particular types of events that are of interest within the media item 415 and should be considered for inclusion with the dynamic summary queue 425. In some embodiments, the user interface 533 includes a custom event settings chart 534 that specifies various events that may occur within the media item 415 and that are currently available for selection by the requestor for inclusion within the dynamic summary queue 425. In some embodiments, the custom event settings chart 534 includes an event descriptor column 543 that includes a brief description of the various events that may occur within the media item 415. The types of the events that may occur within the media item 415 and their corresponding brief descriptions are dependent on the subject matter of the media item 415. For example, if the media item 415 is a video of an auto race (that occurs either in real-life or in a computer game), some example events that may occur in the media item 415 can include green flag, yellow flag, checkered flag, crash, spin out, pass, block, pit, etc., such as shown in the example custom event settings chart 534 of FIG. 5E.

In some embodiments, the custom event settings chart 534 includes an event status column 545 that indicates whether or not the event as described in the corresponding row of the event descriptor column 543 is active or inactive for inclusion in the basis for generating the dynamic summary queue 425. In some embodiments, a setting of "Yes" in the event status column 545 for a given event indicates that the given event is to be included as part of the basis for generating the dynamic summary queue 425 if it occurs within the media item 415 during the time window 516 over which the dynamic summary queue 425 is generated. Conversely, a setting of "No" in the event status column 545 for a given event indicates that the given event is not to be included as part of the basis for generating the dynamic summary queue 425 if it occurs within the media item 415 during the time window 516 over which the dynamic summary queue 425 is generated. In some embodiments, the custom event settings chart 534 includes an adjustment column 547 that includes "Change" controls that when selected will cause the setting in the corresponding row of the event status column 545 to be toggled between "Yes" and "No," and vice-versa. Also, in some embodiments, the custom event settings chart 534 includes a global "No" control 549 that when selected will cause settings in the event status column for all listed events to be set to "No." Also, in some embodiments, the custom event settings chart 534 includes a global "Yes" control 551 that when selected will cause settings in the event status column for all listed events to be set to "Yes." In some embodiments, a default setting in the event status column for all listed events is "Yes."

In some embodiments, the custom event settings chart 534 includes an event strength column 541 in which an event weighting can be specified for the event as described in the corresponding row of the event descriptor column 543. In some embodiments, the event weighting for a given event is specified on a scale of 1 to 10, where 1 is a lowest weighting and 10 is a highest weighting. The event weightings as listed in the event strength column 541 is used by the system 400 to determine which events are to be prioritized higher than other events for inclusion within the dynamic summary queue 425, particularly when there is more content available for inclusion with the dynamic summary queue 425 than what can be accommodated by the current settings in the recap resolution control 505. In various embodiment, the scale used for event weighting can be defined in essentially any manner that provides for normalization of the event weighting inputs so as to enable determination of which events are more important than others.

In some embodiments, the user interface includes 533 includes a add custom event control 553 that when selected will enable the requestor to add a new event (a new row) to the custom event settings chart 534. Also, in some embodiments, the user interface includes 533 includes a reset events control 555 that when selected will reset all of the settings in the custom event settings chart 534 to their respective values that existed when the user interface 533 was displayed in response to selection of the event types control 507. Also, in some embodiments, the user interface 533 includes an auto enable control 535 and a custom enable control 537. Selection of the auto enable control 535 engages use of the machine learning model 413 in the system 400 in determining which of the events that occur within the media item 415 should be included within the basis for generating the dynamic summary queue 425. Selection of the custom enable control 537 engages use of the custom event settings chart 534 by the system 400 in determining which of the events that occur within the media item 415 should be included within the basis for generating the dynamic summary queue 425. In some embodiments, either or both of the auto enable control 535 and the custom enable control 537 can be selected at a given time. In some embodiments, selection of the auto enable control 535 is implemented by default when the custom enable control 537 is de-selected.

Figure 5F:
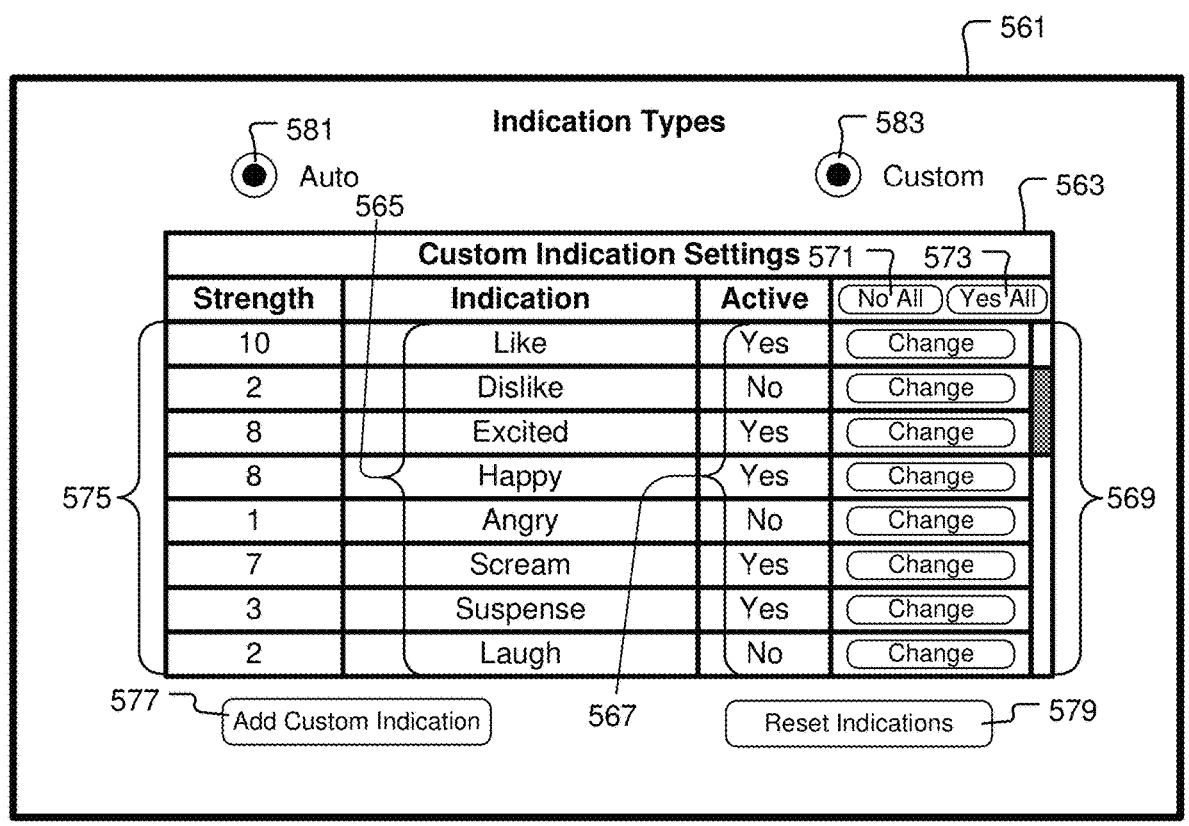
FIG. 5F shows an example of a user interface that is displayed when the "Change" control is selected within the indication types control in the user interface of FIG. 5A, in accordance with some embodiments.

FIG. 5F shows an example of a user interface 561 that is displayed when the "Change" control is selected within the indication types control 509 in the user interface 500 of FIG. 5A, in accordance with some embodiments. The indication types control 509 enables the requestor of the dynamic summary queue 425 to specify particular types of user/participant indications that are of interest during consumption of the media item 415 by the users/participants A-D that should be considered in determining which portions of the media item 415 are to be included within the basis for generating the dynamic summary queue 425. In some embodiments, the user interface 561 includes a custom indication settings chart 563 that specifies various user/participant indications of interest that may occur during consumption of the media item 415 by the users/participants. In some embodiments, the custom indication settings chart 563 includes an indication descriptor column 565 that includes a brief description of the various user/participant indications that are of interest. The various user/participant indications represent various types of responses, expressions, gestures, actions, statements, sounds, and/or communications that may be made by the users/participants A-D as they consume the media item 415. For example, in some embodiments, the various user/participant indications specified in the custom indication settings chart 563 may include liking, disliking, being excited, being happy, being angry, screaming, being in suspense, laughing, among essentially any other type of response, expression, gesture, action, statement, sound, and/or communication that may be made by any of the users/participants A-D during their consumption of the media item 415.

In some embodiments, the custom indication settings chart 563 includes an indication status column 567 that indicates whether or not the user/participant indication as described in the corresponding row of the indication descriptor column 565 is active or inactive for inclusion within the basis upon which content is selected for inclusion within the dynamic summary queue 425. In some embodiments, a setting of "Yes" in the indication status column 567 for a given user/participant indication signifies that the given user/participant indication is to be used included within the basis upon which content is identified/selected for inclusion within the dynamic summary queue 425. Conversely, a setting of "No" in the indication status column 567 for a given user/participant indication signifies that the given user/participant indication is not to be included within the basis upon which content is identified/selected for inclusion within the dynamic summary queue 425. In some embodiments, the custom indication settings chart 563 includes an adjustment column 569 that includes "Change" controls that when selected will cause the setting in the corresponding row of the indication status column 567 to be toggled between "Yes" and "No," and vice-versa. Also, in some embodiments, the custom indication settings chart 563 includes a global "No" control 571 that when selected will cause settings in the indication status column 567 for all listed user/participant indications to be set to "No." Also, in some embodiments, the custom indication settings chart 563 includes a global "Yes" control 573 that when selected will cause settings in the indication status column 567 for all listed user/participant indications to be set to "Yes." In some embodiments, a default setting in the indication status column 567 for all listed user/participant indications is "Yes."

In some embodiments, the custom indication settings chart 563 includes a user/participant indication strength column 575 in which an indication weighting can be specified for the user/participant indication as described in the corresponding row of the indication descriptor column 565. In some embodiments, the indication weighting for a given user/participant indication is specified on a scale of 1 to 10, where 1 is a lowest weighting and 10 is a highest weighting. The indication weightings as listed in the indication strength column 575 are used by the system 400 to determine which user/participant indications are to be prioritized higher than others for inclusion within the basis that is used to identify/select which portions of the media item 415 are to be included within the dynamic summary queue 425. In various embodiment, the scale used for user/participant indication weighting can be defined in essentially any manner that provides for normalization of the user/participant indication weighting inputs so as to enable determination of which user/participant indications are more important than others.

In some embodiments, the user interface includes 561 includes an add custom indication control 577 that when selected will enable the requestor to add a new user/participant indication (a new row) to the custom indication settings chart 563. Also, in some embodiments, the user interface 561 includes a reset indications control 579 that when selected will reset all of the settings in the custom indication settings chart 563 to their respective values that existed when the user interface 561 was displayed in response to selection of the indication types control 509. Also, in some embodiments, the user interface 561 includes an auto enable control 581 and a custom enable control 583. Selection of the auto enable control 581 engages use of the machine learning model 413 in the system 400 in determining which user/participant indications that occur during consumption of the media item 415 by the users/participants A-D should be included within the basis for determining which portions of the media item 415 are to be included within the dynamic summary queue 425. Selection of the custom enable control 583 engages use of the custom indication settings chart 563 by the system 400 in determining which user/participant indications that occur during consumption of the media item 415 by the users/participants A-D should be included within basis for determining which portions of the media item 415 are to be included within the dynamic summary queue 425. In some embodiments, either or both of the auto enable control 581 and the custom enable control 583 can be selected at a given time. In some embodiments, selection of the auto enable control 581 is implemented by default when the custom enable control 583 is de-selected.

Figure 6:
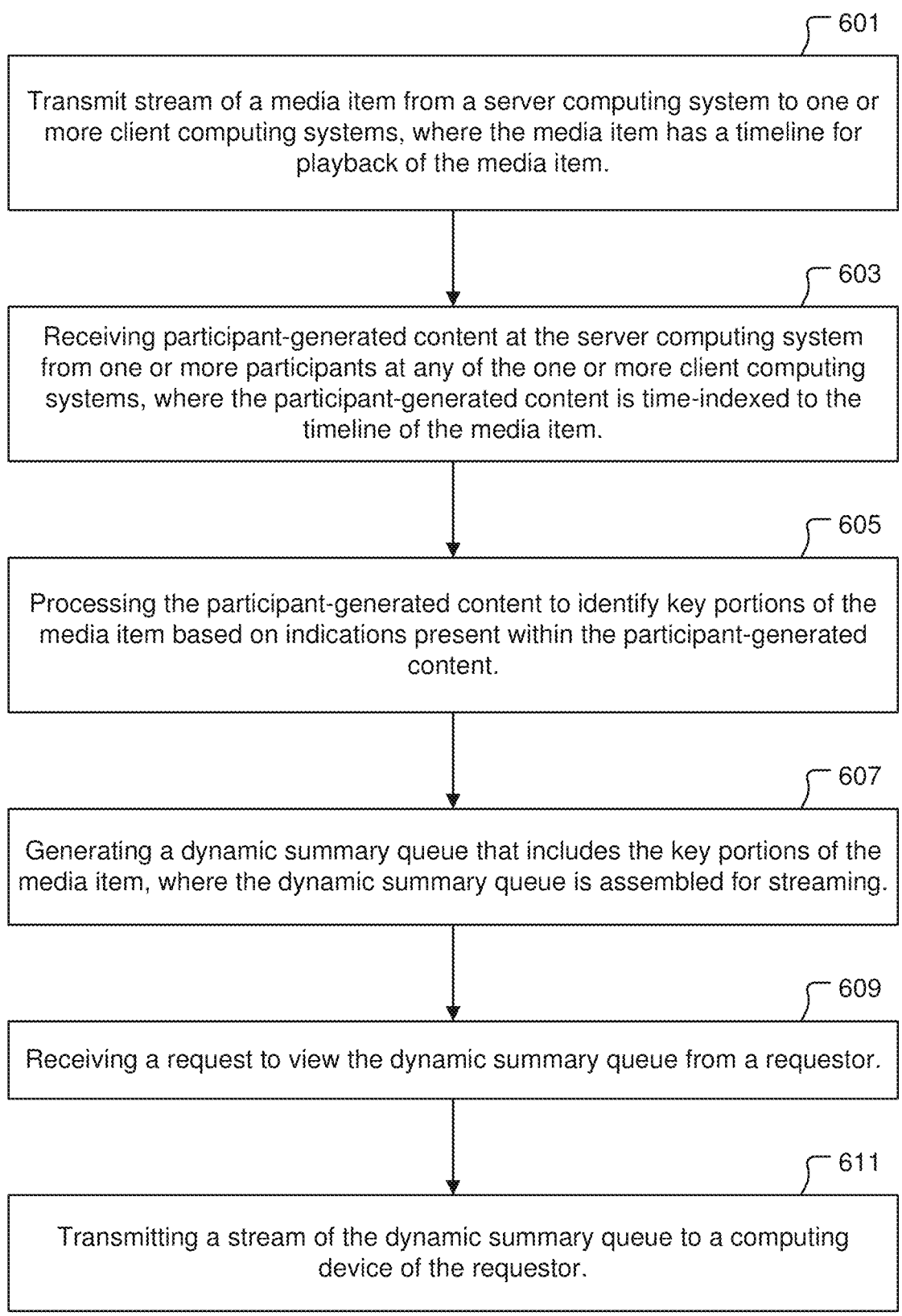
FIG. 6 shows a flowchart of a method for generating a summary (dynamic summary queue) of a media item, in accordance with some embodiments.

FIG. 6 shows a flowchart of a method for generating a summary (dynamic summary queue 425) of a media item (media item 415), in accordance with some embodiments. The method includes an operation 601 for transmitting stream of the media item 415 from a server computing system (such as the cloud gaming system 101 of FIG. 1, by way of example) to one or more client computing systems (such as the local computing systems 120A-120D of FIG. 1, by way of example). The media item 415 has a timeline for playback of the media item 415. In some embodiments, the media item 415 is an audio-visual presentation. In various embodiments, the audio-visual presentation is one or more of a movie, a television show, a real-world sporting event, an electronic sporting event, an online show, an online video, and an uploaded video, among essentially any other type of audio-visual presentation. In some embodiments, the media item 415 is a stream of game video and audio of a video game. In some embodiments, the server computing system is the cloud gaming system 101 configured to execute the video game in accordance with inputs received from respective controller devices 125A-125D of the one or more users/participants (e.g., game players/spectators A-D) at the one or more client computing systems 120A-120D. The cloud gaming system 101 is configured to direct transmission of the stream of game video and audio reflecting play of the video game by the one or more users/participants. In these embodiments, the one or more users/participants provide the user/participant-generated content that is received through the input channels 401 during play of the video game. In some embodiments, the video game is an electronic sports video game. Also, in some embodiments, one or more of the user/participants are spectators of the video game.

The method also includes an operation 603 for receiving user/participant-generated content at the server computing system from one or more users/participants at any of the one or more client computing systems. The user/participant-generated content corresponds to any information received through any of the input channels 401, as described with regard to FIG. 4. The user/participant-generated content is time-indexed to the timeline of the media item 415. Also, it should be understood that the user/participant-generated content is provided by any user/participant that is consuming (watching/listening to) the media item 415. In various embodiments, the user/participant can be a video game player, a video game spectator, and/or a viewer/listener, depending on the nature of the media item 415. In some embodiments, the user/participant-generated content includes one or more of text data, voice data, audio data, emoticon data, image data, camera-captured video data, camera-captured image data, tag data, and controller device input data, among essentially any other type of data that can be provided by the user/participants through the input channels 401.

The method also includes an operation 605 for processing the user/participant-generated content to identify key portions of the media item 415 based on indications present within the user/participant-generated content, where the key portions of the media item 415 are identified for inclusion with the dynamic summary queue 425. In some embodiments, identification of user/participant indications present within the user/participant-generated content is based on a specification of user/participant indication of interest that may occur during consumption of the media item 415 by the user/participants, such as described with regard to FIG. 5F. In some embodiments, the operation 605 also includes processing the media item 415 and/or state/meta-data 417 associated with the media item 415 to identify key portions of the media item 415 for inclusion within the dynamic summary queue 425. In some embodiments, identification of the key portions of the media item 415 is based on a specification of events that may occur within the media item 415, such as described with regard to FIG. 5E.

In some embodiments, the operation 605 for processing the user/participant-generated content includes extracting features from the user/participant-generated content to obtain a set of extracted features 407, such as described with regard to the feature extractor 405 of FIG. 4. Also, in some embodiments, the operation 605 for processing the user/ participant-generated content includes classifying the extracted features 407 into one or more classifications to obtain a set of classified features 411, such as described with regard to the feature classifier 409 of FIG. 4. Also, in some embodiments, the operation 605 for processing the user/participant-generated content includes processing the set of classified features 411 through a machine learning model 413 to identify the key portions of the media item 415 that are to be included within the dynamic summary queue 425. Also, in some embodiments, the operation 605 includes processing state/meta-data 417 of the media item 415 through the machine learning model 413 in conjunction with processing the set of classified features 411 through the machine learning model 413 to identify the key portions of the media item 415 that are to be included within the dynamic summary queue 425. The state/meta-data 417 of the media item 415 is/are correlated by time-index to the set of classified features 411. In some embodiments, the state/meta-data 417 of the media item 415 includes state data of a video game executed in accordance with inputs received from respective controller devices 125A-125D of the one or more users/participants (e.g., A-D) to generate the media item 415 as a stream of game video and audio.

The method also includes an operation 607 for generating a dynamic summary queue (the dynamic summary queue 425) that includes the key portions of the media item 415 as identified in the operation 605. The method also includes assembling the dynamic summary queue 425 for streaming to the requestor of the dynamic summary queue 425. In some embodiments, the operation 607 includes creation of an auto-generated verbal summary and/or an auto-generated written summary of the key portions of the media item 415 for inclusion with in the dynamic summary queue 425. In some embodiments, the dynamic summary queue 425 includes at least some of the user/participant-generated content associated with the key portions of the media item 415, as received from the user/participants through the input channels 401.

The method also includes an operation 609 for receiving a request to view the dynamic summary queue 425 from a requestor. In some embodiments, the requestor is any of the one or more users/participants that are consuming the media item 415. In some embodiments, the requestor is a person invited to join the one or more users/participants in consuming the media item. In some embodiments, the requestor is a person invited to join the one or more users/participants in playing a video game executed in accordance with inputs received from respective controller devices 125A-125D of the one or more users/participants (e.g., A-D) to generate the media item 415 as a stream of game video and audio.

In various embodiments, the operation 609 can occur and any point within the method of FIG. 6. For example, in some embodiments, the request to view the dynamic summary queue 425 can be received in operation 609 before processing of the user/participant-generated content in operation 605. Or, in another example embodiment, the request to view the dynamic summary queue 425 can be received in operation 609 after the dynamic summary queue 425 has already been generated in operation 607. Also, in some embodiments, the request to view the dynamic summary queue 425 as received in operation 609 can include a specification of various controls that are to be applied when generating the dynamic summary queue 425, such as the various controls described with regard to FIGS. 5A-5F. The method also includes an operation 611 for transmitting a stream of the dynamic summary queue 425 to a computing device of the requestor in response to the request received in the operation 609. In some embodiments, the method includes updating the dynamic summary queue 425 as the user/participant-generated content is received at the server computing system (through the input channels 401) and is processed to identify key portions of the media item 415. In some embodiments, updating the dynamic summary queue 425 includes adding new content to the dynamic summary queue 425 and/or changing some content already present within the dynamic summary queue 425.

In some embodiments, the method includes receiving control parameters for generating the dynamic summary queue 425, such as the control parameters described with regard to FIG. 5A. In some embodiments, the control parameters include specification of one or more types of indications present within the user/participant-generated content that are indicative of key portions of the media item 415, such as described with regard to FIG. 5F. In some embodiments, the types of indications include one or more of a response, an expression, a gesture, an action, a statement, a sound, a communication, and/or essentially any other type of indication that can be made by a user/participant in relation to subject matter within the media item 415.

In some embodiments, the control parameters for generating the dynamic summary queue 425 include specification of one or more types of events that may occur within the media item 415, such as described with regard to FIG. 5E. In some embodiments, the control parameters for generating the dynamic summary queue 425 include specification of which of the one or more users/participants the user/participant-generated content is to be limited to when processing the user/participant-generated content (as received through the input channels 401) to identify key portions of the media item 415, such as described with regard to FIG. 5B. In some embodiments, the control parameters for generating the dynamic summary queue 425 include specification of the time window 516 within the timeline for playback of the media item 415 over which the dynamic summary queue 425 is to be generated, such as described with regard to FIG. 5C. In some embodiments, the control parameters for generating the dynamic summary queue 425 include specification of a recap resolution for the dynamic summary queue 425, such as described with regard to FIG. 5D.

Additionally, in some embodiments, the method for generating the dynamic summary queue 425 as described with regard to FIG. 6 is implemented as a system (e.g., system 400) for generating a summary of a video. In these embodiments, the system includes program instructions stored in a computer memory for transmitting a stream of the media item 415 from a server computing system to one or more client computing systems, where the media item 415 has a timeline for playback of the media item 415. The system also includes program instructions stored in the computer memory for receiving user/participant-generated content at the server computing system from one or more users/participants at any of the one or more client computing systems, where the user/participant-generated content is time-indexed to the timeline of the media item 415. The system also includes program instructions stored in the computer memory for processing the user/participant-generated content to identify key portions of the media item 415 based on indications present within the user/participant-generated content. The system also includes program instructions stored in the computer memory for generating the dynamic summary queue 425 that includes the key portions of the media item 415, where the dynamic summary queue 425 is assembled for streaming. The system also includes program instructions stored in the computer memory for receiving a request to view the dynamic summary queue 425 from a requestor. The system also includes program instructions stored in the computer memory for transmitting a stream of the dynamic summary queue 425 to a computing device of the requestor in response to the request.

Figure 7:
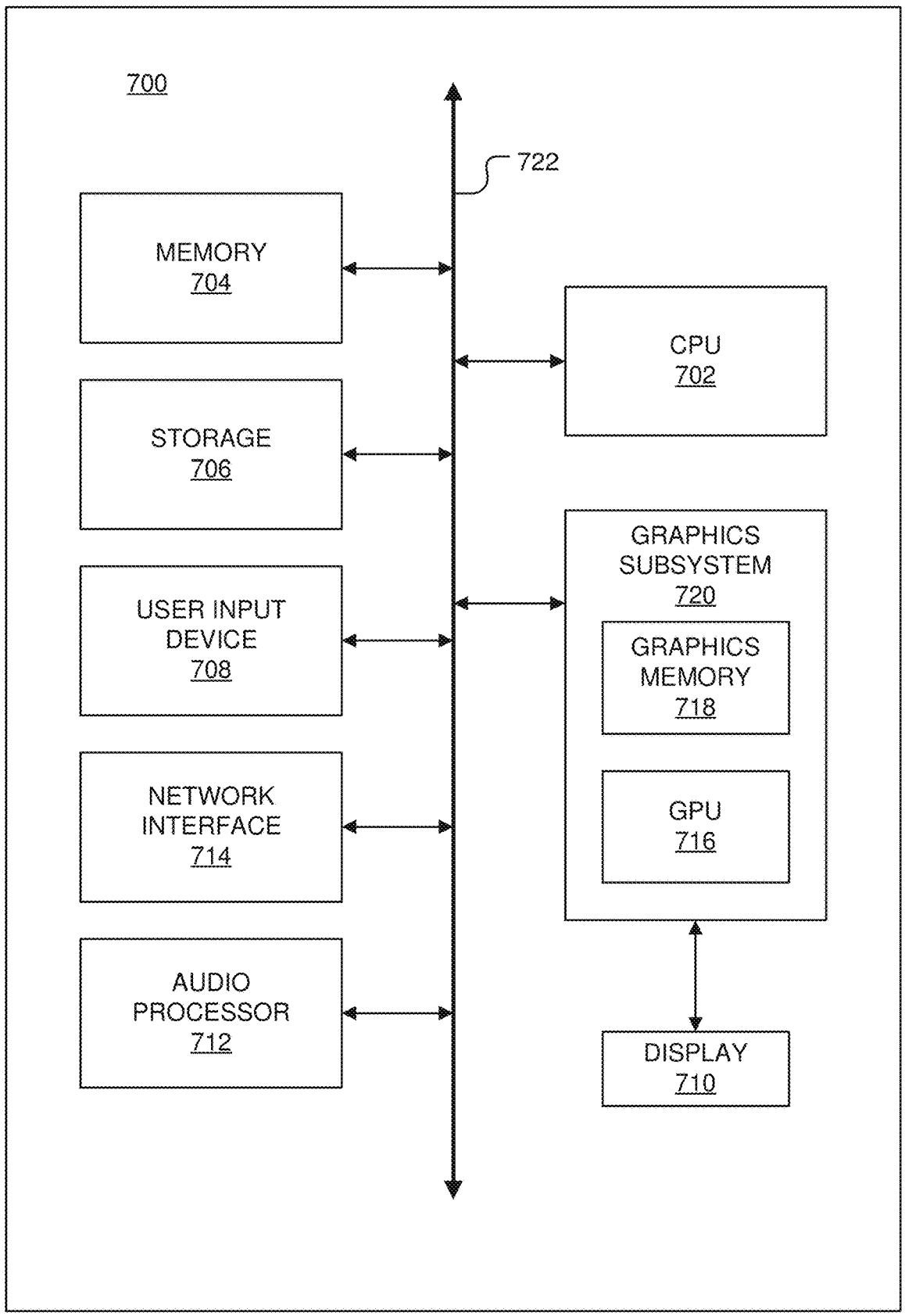
FIG. 7 shows a diagram of components within an example computing device that can be used to perform aspects of the various embodiments of the present disclosure, in accordance with some embodiments.

FIG. 7 shows a diagram of components within an example computing device 700 that can be used to perform aspects of the various embodiments of the present disclosure, in accordance with some embodiments. In various embodiments, the computing device 700 can incorporate or can be a personal computer, video game console, personal digital assistant, a server or other digital device, suitable for practicing an embodiment of the disclosure. The computing device 700 includes a central processing unit (CPU) 702 for running software applications and optionally an operating system. The CPU 702 can include one or more homogeneous or heterogeneous processing cores.

In some embodiments, a video game is executed either locally on a gaming machine, a personal computer, or on a server. In some cases, the video game is executed by one or more servers of a data center. When the video game is executed, some instances of the video game may be a simulation of the video game. For example, the video game may be executed by an environment or server that generates a simulation of the video game. The simulation, on some embodiments, is an instance of the video game. In other embodiments, the simulation maybe produced by an emulator. In either case, if the video game is represented as a simulation, that simulation is capable of being executed to render interactive content (e.g., video frames) that can be interactively streamed, executed, and/or controlled by user input.

The CPU 702 is one or more general-purpose microprocessors that includes one or more processing cores. In some embodiments, the computing device 700 is implemented using one or more CPUs 702 with microprocessor architectures specifically adapted for highly parallel and computationally intensive applications, such as processing operations of interpreting a query, identifying contextually relevant resources, and implementing and rendering the contextually relevant resources in a video game immediately. In various embodiments, the computing device 700 is localized to a player playing a game segment (e.g., game console), or remote from the player (e.g., back-end server processor), or one of many servers using virtualization in a game cloud system for remote streaming of gameplay to clients.

The computing device 700 includes a computer memory 704 that stores applications and data for use by the CPU 702. The computing system 700 also includes a data storage device 706 that provides non-volatile storage of data and computer readable media for applications. In various embodiments, the computing device 700 can include fixed disk drives, removable disk drives, flash memory devices, and/or CD-ROM, DVD-ROM, Blu-ray, HD-DVD, or other optical storage devices, as well as signal transmission and storage media. The computing device 700 also includes one or more user input devices 708 that communicate user inputs from one or more users to the computing device 700. For example, the user input device(s) 708 can include keyboard(s), mouse(s), joystick(s), touch pad(s), touch screen(s), still-image or video recorder(s)/camera(s), tracking device(s) for recognizing gestures, and/or microphone(s). The computing device 700 also includes a network interface 714 that enables the computing device 700 to communicate with other computer systems via an electronic communications network, and may include wired or wireless communication over local area networks and wide area networks such as the Internet. The computing device 700 also includes an audio processor 712 that generates analog and/or digital audio output from instructions and/or data provided by the CPU 702, computer memory 704, and/or data storage device 706. The computing device 700 also includes one or more data bus(es) 722 for connecting the CPU 702, the computer memory 704, the data storage device(s) 706, the user input device(s) 708, the network interface 714, and the audio processor 712.

A graphics subsystem 720 is further connected with the data bus 722 and the various components of the computing device 700. The graphics subsystem 720 includes a graphics processing unit (GPU) 716 and graphics memory 718. The graphics memory 718 includes a display memory (e.g., a frame buffer) used for storing pixel data for each pixel of an output image. The graphics memory 718 can be integrated in the same device as the GPU 716, connected as a separate device with GPU 716, and/or implemented within the computer memory 704. Pixel data can be provided to the graphics memory 718 directly from the CPU 702. Alternatively, the CPU 702 provides the GPU 716 with data and/or instructions defining the desired output images, from which the GPU 716 generates the pixel data of one or more output images. The data and/or instructions defining the desired output images can be stored in the computer memory 704 and/or the graphics memory 718. In some embodiments, the GPU 716 includes three-dimensional (3D) rendering capabilities for generating pixel data for output images from instructions and data defining the geometry, lighting, shading, texturing, motion, and/or camera parameters for a scene. The GPU 716 can further include one or more programmable execution units capable of executing shader programs.

The graphics subsystem 720 periodically outputs pixel data for an image from graphics memory 718 to be displayed on display device 710. The display device 710 can be any device capable of displaying visual information in response to a signal from the computing device 700, including CRT, LCD, plasma, and OLED displays, among essentially any other type of computer display device. In various embodiments, the computing device 700 provides the display device 710 with an analog and/or digital signals.

In various embodiments, the methods and systems disclosed herein are implemented in cloud computing systems that provide access services, such as providing access to video games and/or other media content over a wide geographical area. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide online applications, such as video games, that are accessed from a web browser, while the software and data are stored on the servers in the cloud. The term cloud is used as a metaphor for the Internet, based on how the Internet is depicted in computer network diagrams and is an abstraction for the complex infrastructure it conceals.

In some embodiments, a game server is used to perform operations of a durational information platform for video game players. Most video games played over the Internet operate through connection to the game server. In some embodiments, online video games use a dedicated server application that collects data from players and distributes it to other players. In other embodiments, the online video game is executed by a distributed game engine. In these embodiments, the distributed game engine may be executed on a plurality of processing entities (PEs), such that each PE executes a functional segment of a given game engine that the online video game runs on. In some embodiments, each PE is seen by the game engine as a compute node.

Game engines typically perform an array of functionally diverse operations to execute a video game application along with providing additional services that a user experiences. For example, game engines implement game logic, perform game calculations, physics, geometry transformations, rendering, lighting, shading, audio, as well as additional in-game or game-related services. Additional services may include, for example, messaging, social utilities, audio communication, game play/replay functions, help functions, etc. In some embodiments, game engines are executed on an operating system virtualized by a hypervisor of a particular server. In some embodiments, segments of the game engine are distributed among a plurality of PE's, each of which may reside on different server units of a data center. In some embodiments, the various PE's used to execute the game engine segments can be implemented as a server unit, a virtual machine, or a container, depending on the needs of each game engine segment. For example, if a game engine segment is responsible for camera transformations, that particular game engine segment may be provisioned with a virtual machine associated with a GPU since it will be doing a large number of relatively simple mathematical operations (e.g., matrix transformations). Other game engine segments that require fewer but more complex operations may be provisioned with a processing entity associated with one or more higher power CPU's.

By distributing the game engine, the game engine is provided with elastic computing properties that are not bound by the capabilities of a physical server unit. Instead, the game engine, when needed, is provisioned with more or fewer compute nodes to meet the demands of the video game. From the perspective of the video game and a video game player, the game engine being distributed across multiple compute nodes is indistinguishable from a non-distributed game engine executed on a single processing entity, because a game engine manager or supervisor distributes the workload and integrates the results seamlessly to provide video game output components for the end user.

Users access the remote services with client devices, which include at least a CPU, a display and input/output (I/O) device. The client device can be a personal computer (PC), a mobile phone, a tablet, a netbook, a PDA, or any other type of computing device. In some embodiments, the network executing on the game server recognizes the type of computing device used by the client and adjusts the data communication method employed. In other cases, client devices use a standard data communication method, such as HTML (hypertext markup language), to access the application on the game server over the Internet.

It should be appreciated that a given video game or gaming application may be developed for a specific platform and a specific associated controller device. However, when such a game is made available via a game cloud system, the user may be accessing the video game with a different controller device. For example, a game might have been developed for a game console and its associated controller, whereas the user might be accessing a cloud-based version of the game from a personal computer utilizing a keyboard and mouse. In such a scenario, the input parameter configuration can define a mapping from inputs which can be generated by the user's available controller device (in this case, a keyboard and mouse) to inputs which are acceptable for the execution of the video game. In another example, a user may access the cloud gaming system via a tablet computing device, a touchscreen smartphone, or other touchscreen driven device. In this case, the client device and the controller device are integrated together in the same device, with inputs being provided by way of detected touchscreen inputs/gestures. For such a device, the input parameter configuration may define particular touchscreen inputs corresponding to game inputs for the video game. For example, buttons, a directional pad, or other types of input elements might be displayed or overlaid during running of the video game to indicate locations on the touchscreen that the user can touch to generate a game input. Gestures such as swipes in particular directions or specific touch motions may also be detected as game inputs. In one embodiment, a tutorial can be provided to the user indicating how to provide input via the touchscreen for gameplay, e.g., prior to beginning play of the video game.

In some embodiments, the client device serves as the connection point for a controller device. For example, the controller device communicates through a wireless or wired connection with the client device to transmit inputs from the controller device to the client device. The client device may in turn process these inputs and then transmit input data to the cloud game server over a network (e.g., accessed through a local networking device such as a router). However, in other embodiments, the controller can itself be a networked device, with the ability to communicate inputs directly over the network to the cloud game server, without being required to communicate such inputs through the client device first. For example, the controller might connect to a local networking device (such as a router) to send data to and receive data from the cloud game server. Thus, while the client device may still be required to receive video output from the cloud-based video game and render it on a local display, input latency can be reduced by allowing the controller to send inputs directly over the network to the cloud game server, so as to bypass the client device.

In some embodiments, a networked controller and client device can be configured to send certain types of inputs directly from the controller to the cloud game server, and to send other types of inputs through the client device. For example, inputs whose detection does not depend on any additional hardware or processing apart from the controller itself can be sent directly over the network from the controller to the cloud game server, so as to bypass the client device. Such inputs may include button inputs, joystick inputs, embedded motion detection inputs (e.g., accelerometer, magnetometer, gyroscope), among any other type of input that can be provided through a controller device. However, inputs that utilize additional hardware or require processing by the client device can be sent by the client device to the cloud game server. These inputs can include captured video and/or audio from the game environment that may be processed by the client device before being transmitted to the cloud game server. Additionally, inputs from motion detection hardware of the controller might be processed by the client device in conjunction with captured video to detect the position and motion of the controller, which would subsequently be communicated by the client device to the cloud game server. In some embodiments, the controller device can also receive data (e.g., feedback data, haptic data, etc.) from the client device or directly from the cloud gaming server.

It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations. Embodiments of the present disclosure may be practiced with various computer system configurations including hand-held devices, microprocessor systems, microprocessor-based or programmable consumer electronics, minicomputers, mainframe computers and the like. Also, embodiments of the present disclosure can be practiced in distributed computing environments where tasks are performed by remote processing devices that are linked through a wire-based or wireless network.

Also, although some method operations are described herein in a particular order/sequence, it should be understood that other housekeeping operations may be performed in between various method operations, and/or method operations may be adjusted so that they occur at slightly different times, and/or method operations may be distributed in a system which allows processing of the method operations to occur at various intervals, so long as processing of game telemetry and/or game state data for generating modified game states is performed in a temporally sufficient manner, e.g., so that game telemetry and/or game state is available when needed by subsequent game executable operations.

In some embodiments, various methods and systems disclosed herein are implemented (fabricated) as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, magnetic tapes, and other optical and/or non-optical data storage devices. Also, the computer readable medium can include computer readable tangible media that is distributed over a network-coupled computer system so that the computer readable code is stored and executed in a distributed fashion.

The foregoing description of the embodiments has been provided for purposes of illustration and description, and is not intended to be exhaustive or limiting. Individual elements or features of a particular embodiment are generally not limited to that particular embodiment, but, where applicable, are interchangeable and can be used in a selected embodiment, even if not specifically shown or described. In this manner, one or more features from one or more embodiments disclosed herein can be combined with one or more features from one or more other embodiments disclosed herein to form another embodiment that is not explicitly disclosed herein, but rather that is implicitly disclosed herein. This other embodiment may also be varied in many ways. Such embodiment variations are not to be regarded as a departure from the disclosure herein, and all such embodiment variations and modifications are intended to be included within the scope of the disclosure provided herein.

Although the foregoing embodiments have been described in some detail for purposes of clarity of understanding, it will be apparent that certain changes and modifications can be practiced within the scope of the appended claims. Accordingly, the embodiments disclosed herein are to be considered as illustrative and not restrictive, and are therefore not to be limited to just the details given herein, but may be modified within the scope and equivalents of the appended claims.

What is claimed is:

1. A method for generating a summary of a media item, comprising:
   transmitting a stream of a media item from a server computing system to one or more client computing systems, the media item having a timeline for playback of the media item;
   receiving participant-generated content at the server computing system from one or more participants at any of the one or more client computing systems, the participant-generated content time-indexed to the timeline of the media item;
   processing the participant-generated content to identify key portions of the media item based on indications present within the participant-generated content;
   generating a dynamic summary queue that includes the key portions of the media item, the dynamic summary queue assembled for streaming;
   receiving a request to view the dynamic summary queue from a requestor;
   transmitting a stream of the dynamic summary queue to a computing device of the requestor in response to the request;
   receiving additional participant-generated content at the server computing system from one or more participants at any of the one or more client computing systems as the stream of the media item is transmitted, the additional participant-generated content time-indexed to the timeline of the media item; and
   in response to receiving the additional participant-generated content, automatically changing some content already present within the dynamic summary queue based on the additional participant-generated content while continuing to transmit the stream of the dynamic summary queue.

2. The method as recited in claim 1, wherein the media item is an audio-visual presentation.

3. The method as recited in claim 2, wherein the audio-visual presentation is of one or more of a movie, a television show, a real-world sporting event, an electronic sporting event, an online show, an online video, and an uploaded video.

4. The method as recited in claim 1, wherein the media item is a stream of game video and audio of a video game.

5. The method as recited in claim 4, wherein the server computing system is a cloud gaming system configured to execute the video game in accordance with inputs received from respective controller devices of the one or more participants at the one or more client computing systems, the cloud gaming system configured to direct transmission of the stream of game video and audio reflecting play of the video game by the one or more participants, wherein the one or more participants provide the participant-generated content during play of the video game.

6. The method as recited in claim 4, wherein the video game is an electronic sports video game.

7. The method as recited in claim 1, wherein the participant-generated content includes one or more of text data, voice data, audio data, emoticon data, image data, camera-captured video data, camera-captured image data, tag data, and controller device input data.

8. The method as recited in claim 1, wherein processing the participant-generated content includes extracting features from the participant-generated content to obtain a set of extracted features, classifying the extracted features into one or more classifications to obtain a set of classified features, and processing the set of classified features through a machine learning model to identify the key portions of the media item.

9. The method as recited in claim 8, further comprising: processing state data of the media item through the machine learning model in conjunction with processing the set of classified features through the machine learning model to identify the key portions of the media item, the state data of the media item correlated by time-index to the set of classified features.

10. The method as recited in claim 9, wherein the state data of the media item includes state data of a video game executed in accordance with inputs received from respective controller devices of the one or more participants to generate the media item as a stream of game video and audio.

11. The method as recited in claim 1, wherein the dynamic summary queue includes an auto-generated verbal summary and/or an auto-generated written summary of the key portions of the media item.

12. The method as recited in claim 1, wherein the dynamic summary queue includes at least some of the participant-generated content associated with the key portions of the media item.

13. The method as recited in claim 1, wherein the requestor is any of the one or more participants.

14. The method as recited in claim 1, wherein the requestor is a person invited to join the one or more participants in watching the media item.

15. The method as recited in claim 1, wherein the requestor is a person invited to join the one or more participants in playing a video game executed in accordance with inputs received from respective controller devices of the one or more participants to generate the media item as a stream of game video and audio.

16. The method as recited in claim 1, further comprising: receiving control parameters for generating the dynamic summary queue.

17. The method as recited in claim 16, wherein the control parameters include specification of one or more types of indications present within the participant-generated content that are indicative of key portions of the media item.

18. The method as recited in claim 17, wherein the types of indications include one or more a response, an expression, a gesture, an action, a statement, a sound, and/or a communication made by any of the one or more participants in relation to subject matter within the media item.

19. The method as recited in claim 16, wherein the control parameters include specification of one or more types of events that occur within the media item.

20. The method as recited in claim 16, wherein the control parameters include specification of which of the one or more participants that the participant-generated content is to be limited to when processing the participant-generated content to identify key portions of the media item.

21. The method as recited in claim 16, wherein the control parameters include specification of a time window within the timeline for playback of the media item over which the dynamic summary queue is to be generated.

22. The method as recited in claim 16, wherein the control parameters include specification of a recap resolution for the dynamic summary queue.

23. The method as recited in claim 1, further comprising: automatically adding new content to the dynamic summary queue based on the additional participant-generated content as the stream of the dynamic summary queue is transmitted.

24. The method as recited in claim 1, further comprising: automatically removing some content from the dynamic summary queue based on the additional participant-generated content as the stream of the dynamic summary queue is transmitted.

25. A system for generating a summary of a video, comprising:
program instructions stored in a computer memory for transmitting a stream of a media item from a server computing system to one or more client computing systems, the media item having a timeline for playback of the media item;
program instructions stored in the computer memory for receiving participant-generated content at the server computing system from one or more participants at any of the one or more client computing systems, the participant-generated content time-indexed to the timeline of the media item;
program instructions stored in the computer memory for processing the participant-generated content to identify key portions of the media item based on indications present within the participant-generated content;
program instructions stored in the computer memory for generating a dynamic summary queue that includes the key portions of the media item, the dynamic summary queue assembled for streaming;
program instructions stored in the computer memory for receiving a request to view the dynamic summary queue from a requestor;
program instructions stored in the computer memory for transmitting a stream of the dynamic summary queue to a computing device of the requestor in response to the request;
program instructions stored in the computer memory for receiving additional participant-generated content at the server computing system from one or more participants at any of the one or more client computing systems as the stream of the media item is transmitted, the additional participant-generated content time-indexed to the timeline of the media item; and
program instructions stored in the computer memory for responding to receipt of the additional participant-generated content by automatically changing some content already present within the dynamic summary queue based on the additional participant-generated content while continuing to transmit the stream of the dynamic summary queue.

* * * * *